United States Patent [19]

Nishigori

[11] Patent Number: 5,291,278
[45] Date of Patent: Mar. 1, 1994

[54] LUMINANCE/CHROMINANCE SEPARATOR INCLUDING CROSS-TALK REDUCING FUNCTION

[75] Inventor: Yoshihisa Nishigori, Itami, Japan

[73] Assignee: Matsushita Electric Industrial Co. Ltd., Osaka, Japan

[21] Appl. No.: 824,283

[22] Filed: Jan. 23, 1992

[30] Foreign Application Priority Data

Jan. 29, 1991 [JP] Japan .................... 3-8822

[51] Int. Cl.$^5$ ............................. H04N 9/78
[52] U.S. Cl. ............................. 348/665
[58] Field of Search ............ 358/31, 36; H04N 9/78

[56] References Cited

U.S. PATENT DOCUMENTS 5,025,311  6/1991  Hosoi ....................... 358/31
5,093,715  3/1992  Tokuhara et al. ....... 358/31

FOREIGN PATENT DOCUMENTS 62-145992  6/1987  Japan .

Primary Examiner—Mark R. Powell
Attorney, Agent, or Firm—Stevens, Davis, Miller & Mosher

[57] ABSTRACT

A luminance/chrominance separator includes a high pass filter for separating a high-frequency signal from a composite video signal, an adder for finding a sum signal indicative of a sum of signals before and after one horizontal period with respect to the high-frequency signal, a subtracter for finding a difference between the signals before and after one horizontal period, and a selection circuit for selecting smaller one of the sum and difference signal in absolute value, wherein an output of the selection circuit is used to suppress any leakage of luminance and chrominance signals into the output of a comb filter.

28 Claims, 22 Drawing Sheets

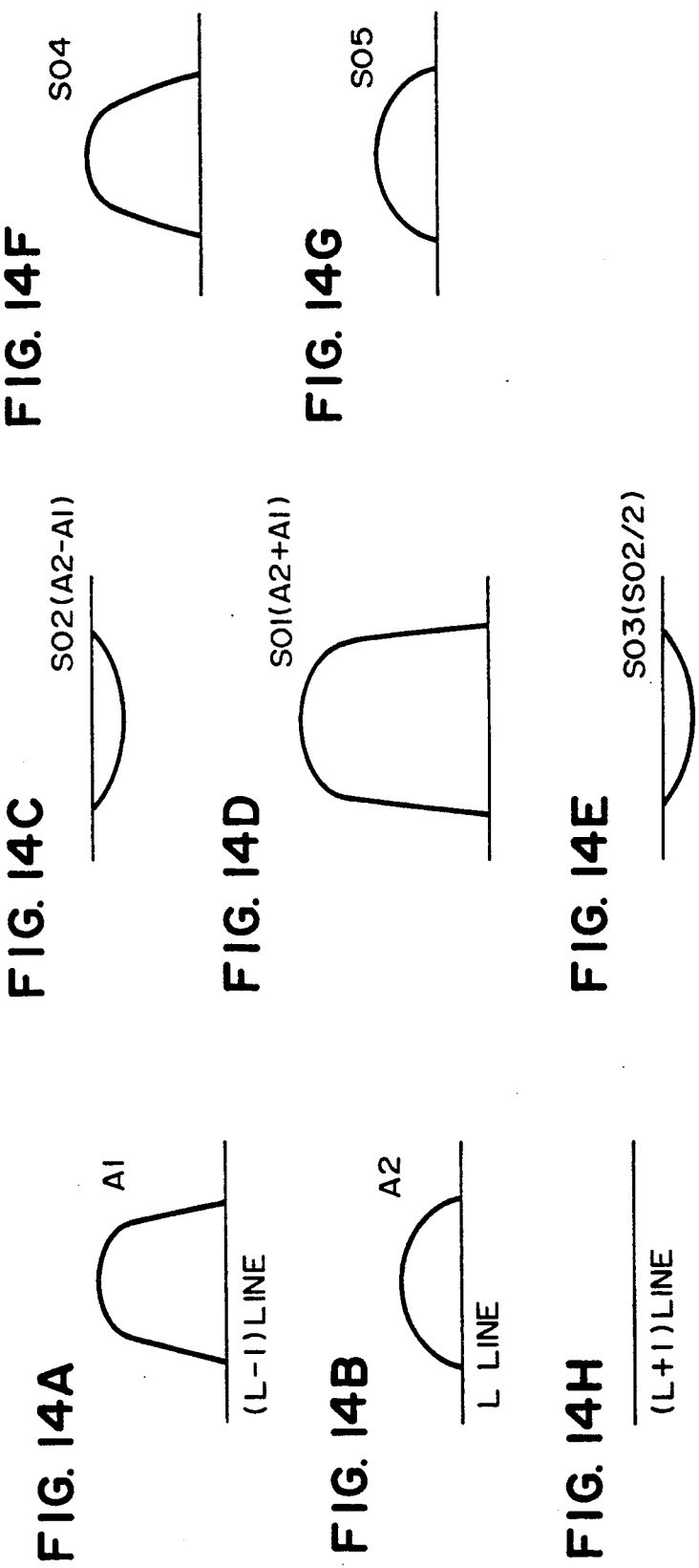

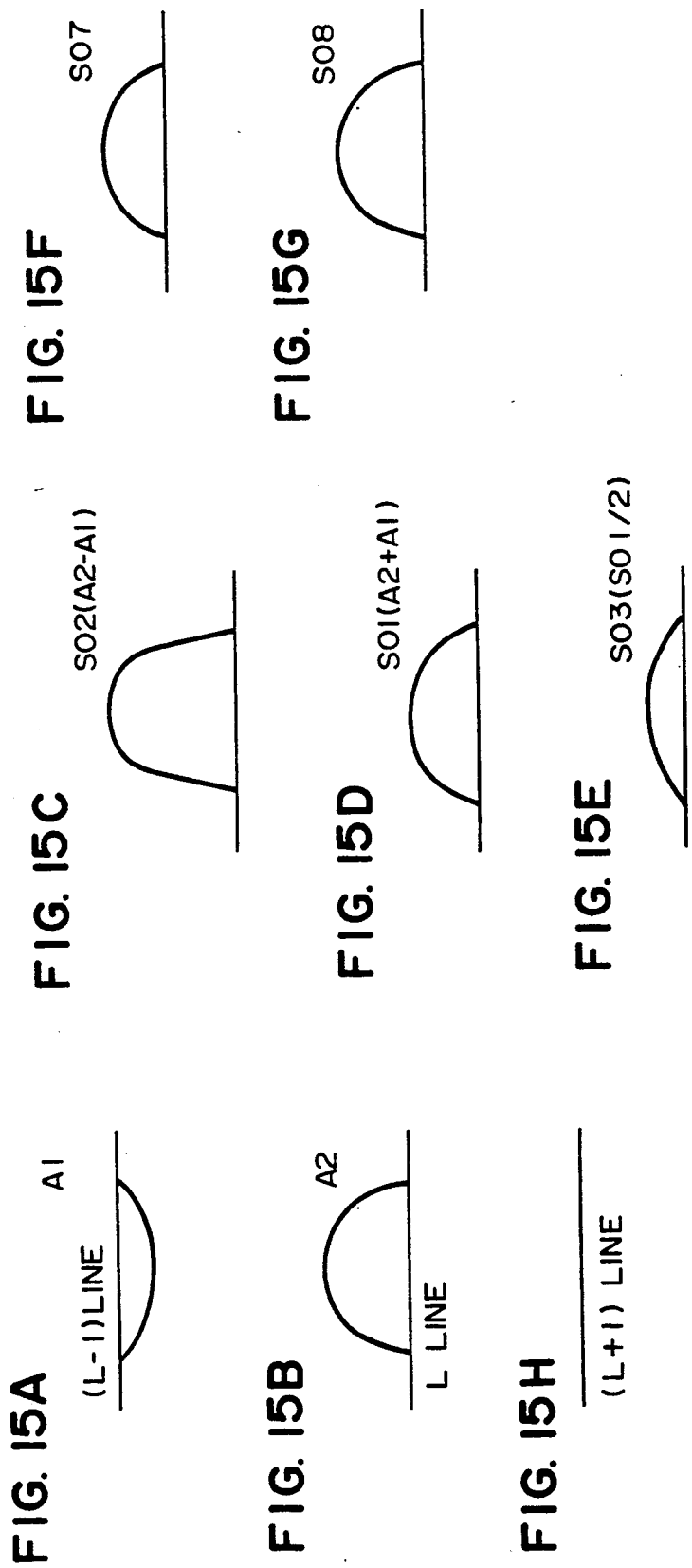

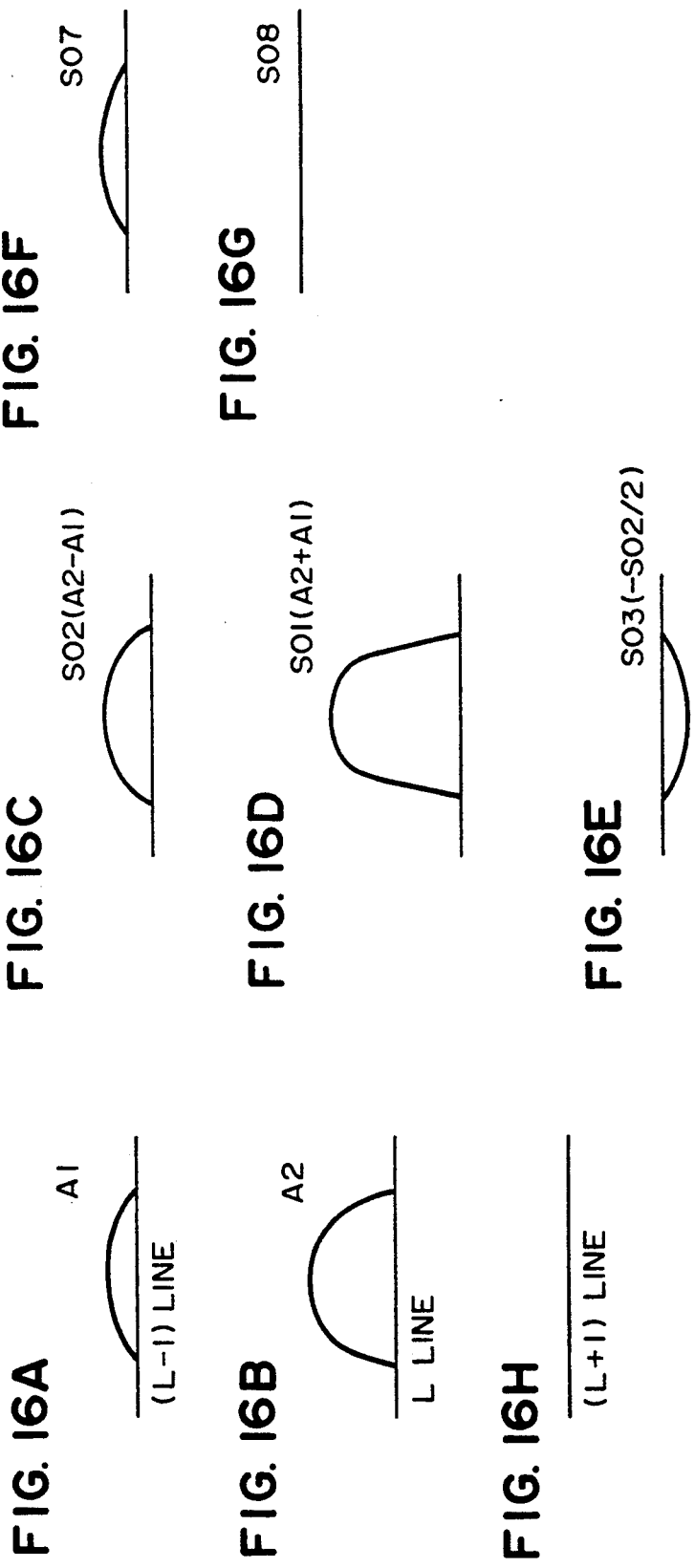

LUMINANCE/CHROMINANCE SEPARATOR INCLUDING CROSS-TALK REDUCING FUNCTION

BACKGROUND OF THE INVENTION

1. Field of the Invention

The present invention generally relates to a luminance/chrominance separator for separating a luminance signal from a chrominance signal in a composite video signal as one of television signals.

2. Description of the Related Art

FIG. 21 shows a first example of conventional luminance/chrominance separators. In the drawing, reference numerals 2102 and 2103 denote one line (1H) memories, numeral 2104 denotes a correlation detection circuit, numeral 2105 denotes a comb filter A, 2106 denotes a comb filter B, 2107 denotes a band pass filter (BPF), 2108 denotes a selection circuit, and 2109 denotes a high pass filter (HPF), respectively.

With such a conventional luminance/chrominance separator arranged as mentioned above, when the separator receives an NTSC signal from a terminal 2101, the 1H memory 2102 receives an input signal S1 and outputs an output signal S2 while the 1H memory 2103 receives the input signal S2 and outputs an output signal S3. Shown in FIG. 20A is a relationship between these pixels S1, S2 and S3 in position and the phase of a color subcarrier. As illustrated, the phase of the color subcarrier is inverted for every line.

The comb filter (A) 2105 subtracts the signal S1 from the signal S2 and outputs a signal C1 containing a chrominance signal and low-pass luminance signal, the comb filter (B) 2106 subtracts the signal S3 from the signal S2 and outputs a signal C2 containing the chrominance signal and the low-pass chrominance signal, and the BPF 2107 outputs a signal C3 having the color subcarrier as its center.

The correlation detection circuit 2104 detects a correlation between the processing pixel S2 and the adjacent pixels S1 and S3 and outputs a signal indicative of an optimum filter to the selection circuit 2108. The detection of the correlation and the selection of the optimum filter are carried out, as an example, in the following manner.

That is, the correlation detection circuit 2104 compares the absolute values of high-frequency components of the signals S1, S2 and S3. When the correlation detection circuit 2104 determines that the signal S2 is closer in magnitude to the signal S1, the signals S2 and S1 have a strong correlation therebetween and the comb filter (A) 2105 is selected as the optimum comb filter. When the signal S2 is close in magnitude to the signal S3, the signals S2 and S3 have a strong correlation therebetween and the comb filter (B) 2106 is selected as the optimum one. Further, if a difference between the signals S2 and S1 or S2 and S3 is greater than a threshold, then the signal S2 has no correlation with the signals S1 and S3 so the BPF 2107 is selected as the optimum one. In this way, the selection circuit 2108 selects optimum one of the filters depending on the output of the correlation detection circuit 2104 and then the low-frequency components are removed from the signal C1, C2 or C3 through the HPF 2109 to obtain a chrominance signal. The chrominance signal is subtracted at a subtraction circuit 2110 from the original signal S2 to obtain a luminance signal.

When such a signal as shown, for example, in FIG. 19A is applied to this conventional luminance/chrominance separator, since this signal is switched from red to black at a boundary line, one of the comb filters using strongly correlative pixels is selected for its separation without deterioration.

Variations in the signal of FIG. 19A at the boundary are shown in FIG. 20B, wherein (L−1) and L line signals indicate both red signals, there is a boundary between L and (L+1) lines, and an (L+1) line signal contains no chrominance signal because it indicates black. Under such a condition, when it is desired to separate the L line signal from the input signal, it is judged that the L and (L−1) lines have a strong correlation therebetween because the L line signal is equal in absolute value to the (L−1) line signal. Since the L line signal is not equal in absolute value to the (L+1) line signal, however, the L and (L−1) line signals are used to carry out the luminance/chrominance signal separation.

Meanwhile, when such a signal as shown in FIG. 19B is applied to the luminance/chrominance separator of FIG. 21 having such an arrangement as mentioned above, the applied signal has a curved boundary which slant part varies smoothly. For this reason, signals at the boundary are shown by FIGS. 13A, 13B and 13H. In the illustrated drawing, the signals each represent a half cycle and have a chrominance signal gradually increased in magnitude from the (L−1) line. Accordingly, the prior art luminance/chrominance separator of FIG. 21 judges that the pixel S2 has no correlation with its upper and lower pixels and thus the BPF 2107 is frequently used. However, when the BPF 2107 is used with respect to such a part of the input signal having a weak correlation as an edge part or an upper or lower part, this results in that a high-frequency luminance signal is lost and the resultant image becomes blurry.

When the BPF 2107 is used for a less amount of part of the input signal for the purpose of preventing such a blurry image, this disadvantageously involves the increase of dot disturbance.

In order to solve the above disadvantage, there has been suggested a second conventional luminance/chrominance separator as shown in FIG. 22 (refer to JP-A-62-145992).

The luminance/chrominance separator of FIG. 22 includes an input terminal 2000, one-line (1H) memories 2001 and 2002, minus ¼ multipliers 2003 and 2005, a ½ multiplier 2004, adders 2006 and 2009, a band pass filter (BPF) 2007 for extracting a signal having frequencies in the vicinity of the frequency of a subcarrier, field memory (1F) 2008, a trap circuit 2010 for suppressing the signal having frequencies in the vicinity of the frequency of the subcarrier, a high pass filter (HPF) 2011, an absolute value circuit (ABS) 2012, an amplitude comparison circuit 2013, an amplitude limiting circuit 2014 and a subtracter 2015.

With the second conventional luminance/chrominance separator having such an arrangement as mentioned above, when a discrete NTSC signal S1 is applied to the separator from the terminal 2000, the input signal is delayed at the 1H memories 2001 and 2002 to obtain a signal corresponding to 3 lines.

Assume that the processing signal is an output S0 of the 1H memory 2001. Then a signal before one line corresponds to an output S2 of the 1H memory 2002 and a signal after one line corresponds to the input signal S1. These signals S0, S1 and S2 are applied to the ¼ multiplier 2004, −¼ multiplier 2003 and −¼ multiplier 2005 respectively and outputs of these multipliers are then applied to the adder 2006. The multipliers 2003, 2004 and 2005 and the adder 2006 make up a comb filter. Since the chrominance signal in the NTSC signal is inverted for every line, the output of the adder 2006 comprises almost a chrominance signal because luminance signal components which have a correlation between three lines are canceled each other.

The output of the adder 2006 is further applied to the BPF 2007 which reduces luminance signal components which have little correlation between three lines.

The processing signal S0 is also applied to the field memory (1F) 2008 and then to the adder 2009 where a signal delayed by one field is added to the signal S0 not subjected to the delaying operation. The field memory 2008 comprises, more precisely, a 262-line delay circuit. Thus, the phase of a color subcarrier in the output of the 1F memory 2008 is inverted with respect to the phase of its input signal. For this reason, the output of the adder 2009 contains no color subcarrier because it is canceled each other at the adder 2009.

Further, the output of the adder 2009 is subjected at the trap circuit 2010 to a suppression of its color subcarrier components, subjected at the HPF 2011 to an extraction of its high-frequency components, subjected at the absolute value circuit 2012 to a calculation of absolute value of the output of the HPF 2011, subjected at the amplitude comparison circuit 2013 to an amplitude comparison between a reference value and the absolute value, and then subjected at the amplitude limiting circuit 2014 to a limitation of amplitude of the aforementioned chrominance signal output of the comb filter. The circuit of FIG. 22 judges whether the chrominance signal output of the comb filter corresponds to the original chrominance signal or a cross color noise signal (leakage of the luminance signal into the chrominance signal) and on the basis of such a decision result, adjusts the chrominance signal output.

Explanation will next be made as to the operation of the second prior art luminance/chrominance separator by referring to FIGS. 23-25.

FIG. 23 (A) shows a luminance signal at the current scanning line, FIG. 23(B) shows an output of the HPF 2011 and FIG. 23 (C) shows the output of the absolute value circuit 2012. Since the signal of FIG. 23 (A) has no high-frequency component, luminance/chrominance separation can be carried out from the signal and no cross color noise occurs without use of any comb filter. Accordingly, the output of the absolute value circuit 2012 is as shown in FIG. 23 (C), i.e., is below a reference level S and thus a chrominance (C) signal (in this case, no chrominance signal exists) is output from the amplitude adjustment circuit 2014 as it is.

When the luminance signal is as shown in FIG. 24 (A), the luminance signal has a high-frequency component at its edge part and thus the high-frequency component of the luminance signal leaks into the chrominance signal. In this case, the output of the absolute value circuit 2012 exceeds a threshold level S at its edge part as shown in FIG. 24 (C). Thus, the amplitude limiting circuit 2014 suppresses the leaked cross color signal at the edge part.

When the high-frequency component of the luminance signal has a frequency close to that of the chrominance signal as shown in FIG. 25(A), the output of the absolute value circuit 2012 exceeds the threshold level S as shown in FIG. 25(C), even in which case the unnecessary cross color interference or noise signal (corresponding to part of the luminance signal leaked into the chrominance signal) is suppressed at the amplitude limiting circuit 2014.

However, in the case where a moving picture signal is applied to the second prior art luminance/chrominance separator, no leakage of the luminance signal into the chrominance signal but the adder 2009 outputs a signal, which results in that, in spite of the fact of no leakage of the luminance signal into chrominance signal, the chrominance signal is suppressed.

In addition, the prior art luminance/chrominance separator has had such a problem that the separator can suppress the leakage of the luminance signal into the chrominance signal but cannot suppress the reverse leakage of the chrominance signal into the luminance signal.

SUMMARY OF THE INVENTION

It is therefore an object of the present invention to provide a luminance/chrominance separator which can produce less cross-talk between a luminance signal and a chrominance signal.

In accordance with an aspect of the present invention, the above object is attained by providing a luminance/chrominance separator which comprises a band pass filter for separating a high-frequency signal from a composite video signal, means for obtaining signals corresponding to a sum of signals before and after one horizontal period of the high-frequency signal and a difference therebetween, means for detecting smaller one of the sum and difference signals in absolute value, and means for, on the basis of an output of the detection means, calculating a correction signal signal so as to reduce crosstalk.

BRIEF DESCRIPTION OF THE DRAWINGS

FIGS. 14A to 14H are diagrams for explaining the operation of the invention when a luminance signal is present;

FIGS. 15A to 15H are diagrams for explaining the second operation of the invention when a chrominance signal is present;

FIGS. 16A to 16H are diagrams for explaining the second operation of the invention when a luminance signal is present;

DESCRIPTION OF THE PREFERRED EMBODIMENTS

The present invention will be explained in conjunction of embodiments of the present invention with reference to the accompanying drawings.

Figure 1:
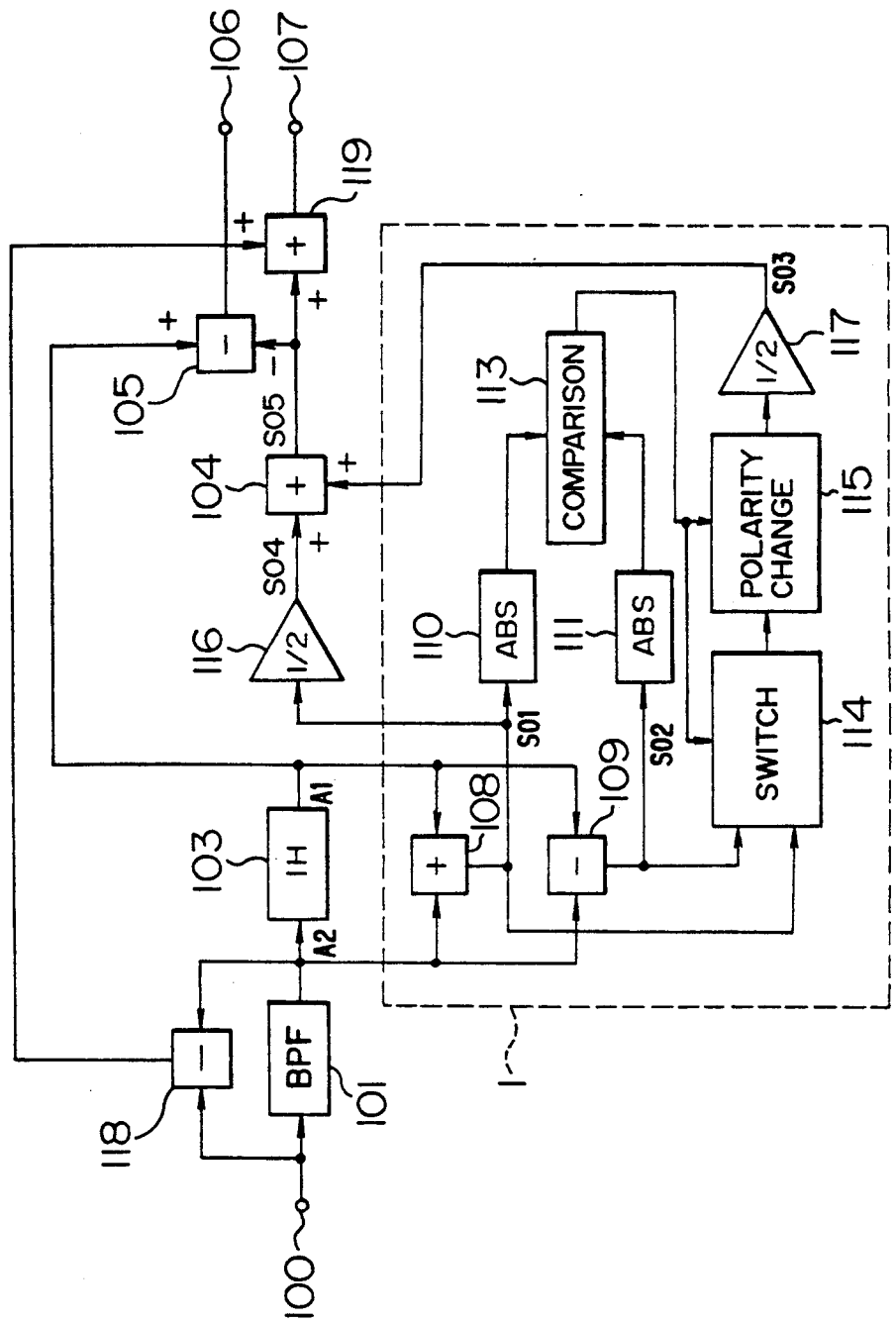
FIG. 1 shows an arrangement of a luminance/chrominance separator in accordance with a first embodiment of the present invention.

Referring first to FIG. 1, there is shown an arrangement of a luminance/chrominance separator in accordance with a first embodiment of the present invention. In the drawing, the illustrated separator includes a band pass filter (BPF) 101 for separating a high-frequency signal from a video signal by passing therethrough only components of the video signal having frequencies close to that of a subcarrier, a one line delay (1H) circuit 103, an adder 108 for obtaining a sum signal corresponding to a sum of the high-frequency signal not subjected to a delaying operation and the high-frequency signal subjected to the delaying operation at the currently processing scanning line, a subtracter 109 for obtaining a difference signal corresponding to a difference between the not delayed high-frequency signal and the delayed high-frequency signal, and absolute value circuits (ABSs) 110 and 111 for obtaining the absolute values of the sum and difference signals respectively.

Also included in the illustrated luminance/chrominance separator of FIG. 1 are a comparison circuit 113 for comparing outputs of the absolute value circuits 110 and 111, a switch 114 for selecting one of the outputs of the adder 108 and subtracter 109 according to the output of the comparison circuit 113, a polarity change circuit 115 for reversing the polarity of output of the switch 114 according to the judgement result of the comparison circuit 113, a ½ multiplier 117 for obtaining half of the output of the polarity change circuit 115, these circuits 113,114, 115, 117 making up a correction value calculation circuit which acts to obtain a correction signal with use of the sum and difference signals based on a magnitude relation between the sum and difference signals in magnitude value.

Also included in the luminance/chrominance separator of FIG. 1 is a ½ multiplier 116 for obtaining half of the output of the adder 108, which multiplier 116 forms together with the ½ multiplier 116 a comb filter for separating the luminance signal and the chrominance signal from the not delayed high-frequency signal and the current high-frequency signal delayed by one horizontal period.

An adder 104 for adding together the outputs of the ½ multipliers 116 and 117 forms a correction circuit for correcting an unnecessary component contained in the output of the comb filter with use of a correction value of the correction value calculation circuit.

Further included in the luminance/chrominance separator of FIG. 1 are a subtracter 118 for subtracting the high-frequency output signal of the BPF 101 from the composite video input signal received through an input terminal 100, an adder 119 for adding together the high-frequency luminance signal of the output of the adder 104 and the low-frequency luminance signal which is obtained as the output of the subtracter 118 and for outputting it as a luminance signal from a terminal 107, and a subtracter 105 for subtracting the high-frequency luminance signal of the output of the adder 104 from the high-frequency signal of the output of the 1H delay 103 and for outputting it as a chrominance signal from a terminal 106.

With the first luminance/chrominance separator having such an arrangement as mentioned above, an NTSC signal is applied to the separator at the input terminal 100, a signal having frequencies in the vicinity of the frequency of the subcarrier is filtered from the NTSC signal through the BPF 101 to obtain a signal A2. The signal A2 is then applied to the 1H delay 103 to obtain a signal A1 delayed by one line.

The output A1 of the BPF 101 is also sent to the subtracter 118 where the signal A1 is subtracted from the input signal to obtain a low-frequency signal comprising low-frequency luminance signal. The adder 108 adds together the current high-frequency signal (output A1 of the 1H delay 103) and the high-frequency signal (output A1 of the BPF 101) not delayed by one line to form an addition value 'so1' which is then applied to the absolute value circuit 110 to calculate its absolute value. An output of the absolute value circuit 110 is sent to the comparison circuit 113 as its first input signal.

The subtracter 109 subtracts the high-frequency signal delayed by one line from the current high-frequency signal to form a subtraction signal 'so2' which is then applied to the absolute value circuit 111. The absolute value circuit 111 calculates an absolute value of the input signal 'so2' to generate an absolute value signal that is then sent to the comparison circuit 113 as its second input signal. The comparison circuit 113 compares the first and second input signal in magnitude and outputs the smaller signal. The switch circuit 114 selectively outputs the smaller one (in magnitude) of the outputs of the adder 108 and subtracter 109 according to the output of the comparison circuit 113.

The output of the switch circuit 114 is sent to the polarity change circuit 115 which in turn inverts the polarity of the input signal according to the judgement result of the comparison circuit 113. When the comparison circuit 113 judges that the output of the absolute value circuit 110 (the absolute value of the output of the adder 108) is smaller, the polarity change circuit 115 inverts the polarity of the input signal (output of the adder 108) and outputs it. When the comparison circuit 113 judges that the output of the absolute value circuit 111 (the absolute value of the output of the subtracter 109) is smaller, the polarity change circuit 115 outputs the input signal (output of the subtracter 109) without any change. The output of the polarity change circuit 115 is sent to the ½ multiplier 117 to be made half and to form a signal 'so3' which is then sent to the adder 104.

The adder 108 receives the current high-frequency signal and the high-frequency signal not delayed by one line to obtain the addition signal 'so1' which is then sent to the ½ multiplier 116. The ½ multiplier 116 outputs an output signal 'so4' which is then sent to the adder 104. The adder 108 and the ½ multiplier 116 makes up a comb filter which outputs a luminance signal. The output 'so4' of the ½ multiplier 116 is added to the output of the ½ multiplier 117 at the adder 104 to remove an unnecessary component therefrom. An output 'so5' of the adder 104 is applied to the subtracter 105 and also to the adder 119.

The output 'so5' of the adder 104 is added at the adder 119 to the low-frequency luminance signal of the output of the subtracter 118. The addition signal of the adder 119 is output from the terminal 107 as a luminance signal. The signal 'so5' is also sent to the subtracter 105 to be subtracted from the high-frequency signal of the output of the 1H delay 103 to obtain a chrominance signal. The chrominance signal of the subtracter 105 is then output from the terminal 106.

Figure 13A:
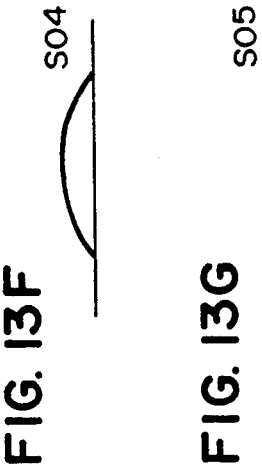
FIGS. 13A to 13H are diagrams for explaining the operation of the invention when a chrominance signal is present.
Figure 13B:
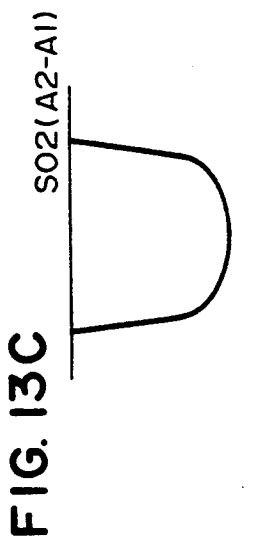
Figure 13C:
Figure 13D:
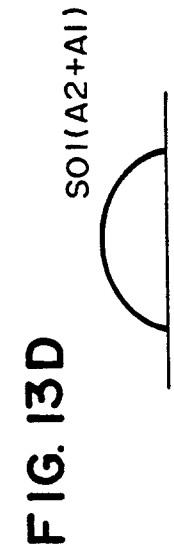
Figure 13E:
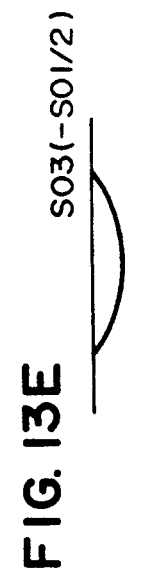
Figure 13F:
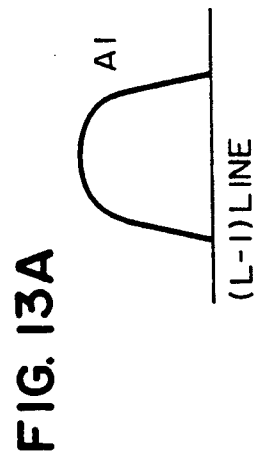
Figure 13G:
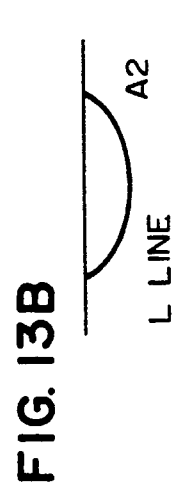
Figure 13H:

Next explanation will be made as to the operation of the first luminance/chrominance separator by referring to FIGS. 13A to 13H and 14A to 14H, where FIGS. 13A and 14A, FIGS. 13B and 14B, . . . , FIGS. 13G and 14G show the signals A1, A2, 'so2', 'so1', 'so3', 'so4' and 'so5' in FIG. 1, respectively.

FIGS. 13A to 13H show the case where a chrominance signal is present, in which the chrominance signal A1 of FIG. 13A before one line is larger than the current chrominance signal A2 of FIG. 13B. In this case, the output 'so4' of the comb filter comprising the adder 102 and the ½ multiplier 116 corresponds to half of a sum of the chrominance signals A1 and A2 as shown by FIG. 13F and contains a high-frequency signal having an unnecessary component therein. The comparison circuit 113 in FIG. 1 receives the absolute values of the signal 'so1' of FIG. 13D and the signal 'so2' of FIG. 13C as its two input signals and in this case, judges that the signal 'so1' is smaller in absolute value than the signal 'o2'. The switch circuit 114 selects and outputs the smaller signal according to the output of the comparison circuit 113. The polarity change circuit 115 inverts the polarity of the signal 'so1' because the signal 'so1' is selected. The output 'so3' of the ½ multiplier 117 corresponds to half of the minus signal 'so1' ($-$so1/2) as shown by FIG. 13E.

The adder 104 adds together the signal shown in FIG. 13E and the output shown in FIG. 13F of the aforementioned comb filter to remove the unnecessary component from the high-frequency luminance signal of the output of the comb filter and to obtain the right signal shown in FIG. 13G.

FIGS. 14A to 14H show the case where a luminance signal is present, in which the luminance signal A1 of FIG. 14A before one line is larger than the current luminance signal A2 of FIG. 14B. In this case, the output 'so4' of the comb filter corresponds to half of a sum of the luminance signals A1 and A2 as shown by FIG. 14F and contains a high-frequency signal having an unnecessary component therein. The comparison circuit 113 in FIG. 1 receives the absolute values of the signal 'so1' of FIG. 14D and the signal 'so2' of FIG. 14C as its two input signals and in this case, judges that the signal 'so2' is smaller in absolute value than the signal 'so1'. The switch circuit 114 selects and outputs the smaller signal 'so2' according to the output of the comparison circuit 113. The polarity change circuit 115 does not invert the polarity of the signal 'so2' because the signal 'so2' is selected. The output 'so3' of the ½ multiplier 117 corresponds to half of the signal 'so2' (so2/2) as shown by FIG. 14E.

The adder 104 adds together the signal shown in FIG. 14E and the output of the aforementioned comb filter shown in FIG. 14F to remove the unnecessary component from the high-frequency luminance signal of the output of the comb filter and to obtain the right signal shown in FIG. 14G.

When the correlation is weak in this way, a section enclosed by a dotted line 1 in FIG. 1 can calculate a correction value for the comb filter to remove the unnecessary component from the separated luminance signal. When the correlation is strong, the output 'so3' of the section 1 becomes substantially zero.

Figure 2:
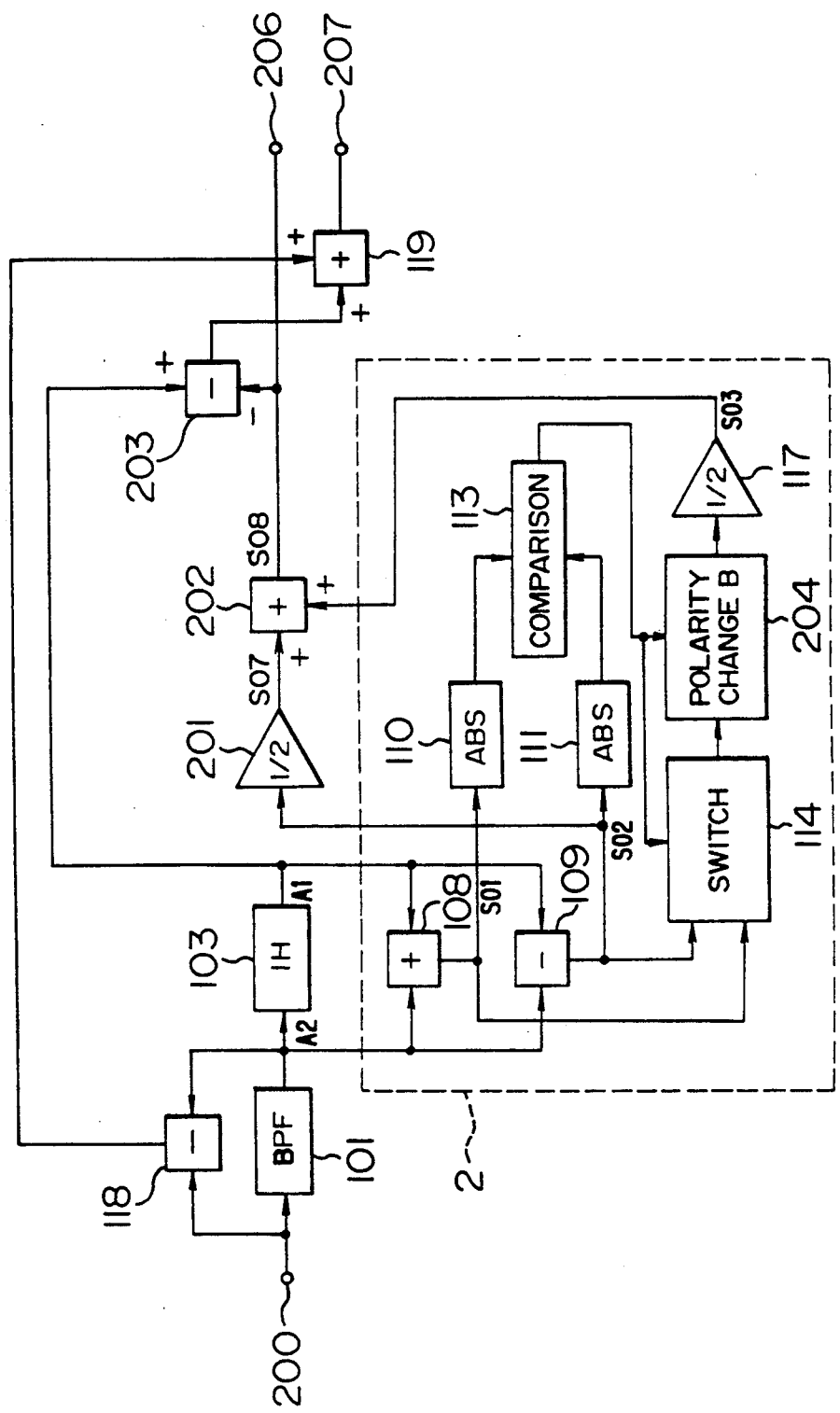
FIG. 2 shows an arrangement of a luminance/chrominance separator in accordance with a second embodiment of the present invention.

FIG. 2 shows a second luminance/chrominance separator in accordance with a second embodiment of the present invention, wherein parts having the same reference numerals have the same functions as those of FIG. 1 and detailed explanation thereof is omitted.

The luminance/chrominance separator of FIG. 2 includes a polarity change circuit B 204 for inverting the polarity of the output of the switch circuit 114 according to the judgement result of the comparison circuit 113. The polarity change circuit 204 forms a correction value calculation circuit B, together with the adder 108, subtracter 109, absolute value circuits 110 and 111, switch circuit 114, and ½ multiplier 117.

Also included in the luminance/chrominance separator of FIG. 2 is a ½ multiplier 201 which multiplies the output of the subtracter 109 by half. The adder 210 forms together with the subtracter 109 a comb filter B which separates the chrominance signal on the basis of the current high-frequency signal and the high-frequency signal before one line.

An adder 202 for adding together the outputs of the ½ multipliers 201 and 117 forms a correction circuit which corrects the unnecessary component contained in the output of the comb filter B with use of the correction value of the aforementioned correction value calculation circuit B and outputs it as a chrominance signal from a terminal 206.

A subtracter 203 subtracts the chrominance signal of the output of the adder 202 from the high-frequency signal of the output of the 1H delay 103 to obtain a high-frequency luminance signal, and the adder 119 adds together the low-frequency luminance signal of the output of the subtracter 118 and the high-frequency luminance signal of the output of the subtracter 203 and outputs it from a terminal 207 as a luminance signal.

With the second luminance/chrominance separator arranged as mentioned above, the output of the switch circuit 114 is sent to the polarity change circuit B 204. The polarity change circuit B 204 inverts the polarity of its input signal according to the judgement result of the comparison circuit 113. When the comparison circuit 113 judges that the output of the absolute value circuit 110 (absolute value of the output of the adder 108) is smaller, the polarity change circuit B 204 outputs its input signal (output of the adder 108) as it is. When the comparison circuit 113 judges that the output of the absolute value circuit 111 (absolute value of the output of the subtracter 109) is smaller, the polarity change circuit B 204 inverts the polarity of the input signal. The output of the polarity change circuit B 204 is made to half in magnitude at the ½ multiplier 117 which in turn generates an output signal 'so3'.

The subtracter 109 and the ½ multiplier 201 constitute, as mentioned above, a comb filter B for chrominance signal separation which generates an output signal 'so7'. The chrominance signal 'so7' is added at the adder 202 to the correction value calculated at the correction value calculation circuit B to cancel the unnecessary component in the chrominance signal. An output 'so8' of the adder 202 is output from the terminal 206 as the chrominance signal and also is applied to the subtracter 203 to be subtracted from the high-frequency signal to obtain a high-frequency luminance signal. The high-frequency luminance signal of the output of the subtracter 203 is added at the adder 119 to the low-frequency luminance signal to obtain the luminance signal which is then output from the terminal 207.

Explanation will then be made as to the operation of the second luminance/chrominance separator by referring to FIGS. 15A to 15H and 16A to 16H, where FIGS. 15A and 16A, FIGS. 15B and 16B, ..., FIGS. 15G and 16G show the signals A1, A2, 'so2', 'so1', 'so3', 'so7' and 'so8' in FIG. 2, respectively.

FIGS. 15A to 15H show the case where a chrominance signal is present, in which the chrominance signal A1 of FIG. 15A before one line is smaller than the current chrominance signal A2 of FIG. 15B. In this case, the output 'so7' of the comb filter comprising the subtracter 109 and the ½ multiplier 201 corresponds to half of a sum of the chrominance signals A1 and A2 as shown by FIG. 15F and contains a high-frequency signal having an unnecessary component therein. The comparison circuit 113 in FIG. 2 receives the absolute values of the signal 'so1' of FIG. 15D and the signal 'so2' of FIG. 15C as its two input signals and in this case, judges that the signal 'so1' is smaller in absolute value than the signal 'so2'. The switch circuit 114 selects and outputs the smaller signal according to the output of the comparison circuit 113. The polarity change circuit B 204 does not invert the polarity of the signal 'so1' because the signal 'so1' is selected. The output 'so3' of the ½ multiplier 117 corresponds to half of the signal 'so1' (so1/2) as shown by FIG. 15E.

The adder 202 adds together the signal shown in FIG. 15E and the output of the aforementioned comb filter shown in FIG. 15F to remove the unnecessary component from the chrominance signal of the output of the comb filter and to obtain the right signal shown in FIG. 15G.

FIGS. 16A to 16H show the case where a luminance signal is present, in which the luminance signal A1 of FIG. 16A before one line is smaller than the current luminance signal A2 of FIG. 16B. In this case, the output 'so7' of the comb filter corresponds to half of a difference between the luminance signals A1 and A2 as shown by FIG. 16F and contains the current chrominance signal having an unnecessary component therein. The comparison circuit 113 in FIG. 2 receives the absolute values of the signal 'so1' of FIG. 16D and the signal 'so2' of FIG. 16C as its two input signals and in this case, judges that the signal 'so2' is smaller in absolute value than the signal 'so1'. The switch circuit B 202 selects and outputs the smaller signal 'so2' according to the output of the comparison circuit 113. The polarity change circuit B 204 inverts the polarity of the signal 'so2' because the signal 'so2' is selected. The output 'so3' of the ½ multiplier 117 corresponds to half of the minus signal 'so2' ($-so2/2$) as shown in FIG. 16F.

The adder 202 adds together the signal shown in FIG. 16E and the output of the aforementioned comb filter shown in FIG. 16F to remove the unnecessary component from the chrominance signal of the output of the comb filter and to obtain the right signal shown in FIG. 16G.

When the correlation is weak in this way, a section 2 enclosed by a dotted line in FIG. 2 can calculate a correction value for the comb filter to remove the unnecessary component from the separated chrominance signal. When the correlation is strong, the output 'so3' of the section 2 becomes substantially zero.

Figure 3:
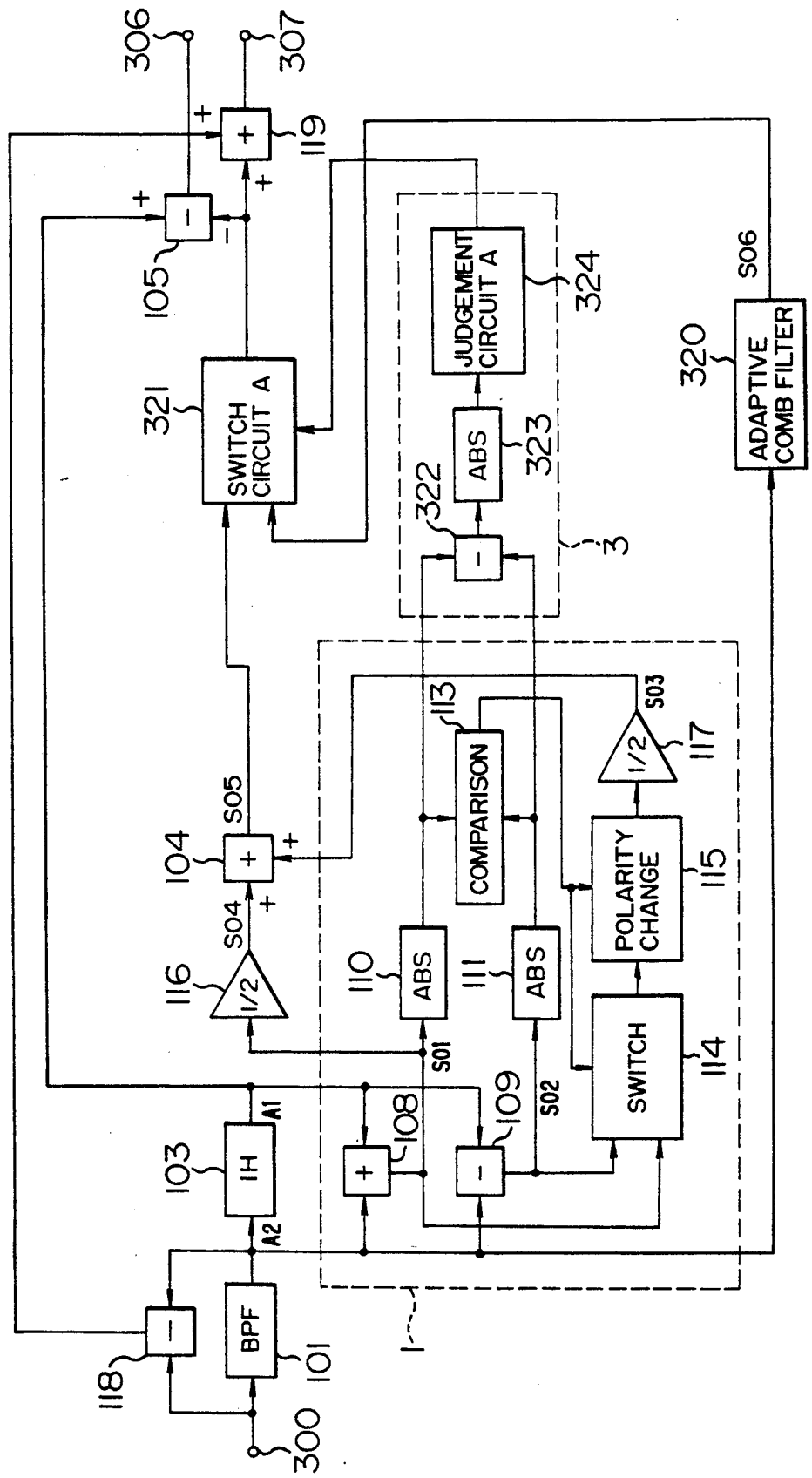
FIG. 3 shows an arrangement of a luminance/chrominance separator in accordance with a third embodiment of the present invention.

FIG. 3 shows an arrangement of a third luminance/chrominance separator in accordance with a third embodiment of the present invention. In the drawing, parts having the same reference numerals as in FIG. 1 have the same functions and thus detailed explanation thereof is omitted.

The luminance/chrominance separator of FIG. 3 includes an adaptive comb filter 320 which receives a high-frequency signal not delayed as the output of the BPF 101 and outputs a high-frequency luminance signal 'so6' separated based on a known method.

Also included in the luminance/chrominance separator of FIG. 3 are a subtracter 322 for finding a difference between the outputs of the absolute value circuits 110 and 111, an absolute value circuit (ABS) 323 for finding the absolute value of an output of the subtracter 322, a judgement circuit A 324 for examining a magnitude relationship between the output of the absolute value circuit 323 and a certain threshold, and a switch circuit A 321 for switchingly selecting one of the output of the adder 104 and the output of the adaptive comb filter 320 according to the output of the judgement circuit 324 as the control signal of the switch circuit A 321.

With the third luminance/chrominance separator arranged as mentioned above, outputs of the absolute value circuits 110 and 111 are applied to the subtracter 322 to find a difference therebetween. The difference signal of the subtracter 322 is then sent to the absolute value circuit 323 to calculate an absolute value of the difference signal which in turn is sent to the judgement circuit A 324. The judgement circuit A 324 examines a magnitude relationship between the input signal of the absolute value circuit 323 and a certain threshold and sends its examination result to the switch circuit A 324 as its control signal. When the judgement circuit A 324 judges that the output of the adaptive comb filter 320 is smaller than the threshold, the judgement circuit A 324 selects the output 'so6' of the adaptive comb filter 320, while otherwise, the judgement circuit 324 selects the output 'so5' of the adder 104. The high-frequency luminance signal of the output of the switch circuit A 321 is added at the adder 119 to the low-frequency luminance signal of the output of the subtracter 118 and then output from a terminal 307 as a luminance signal. Meanwhile, the high-frequency luminance signal is also applied to the subtracter 105 to be subtracted from the high-frequency signal of the output of the HPF 101 and then output from a terminal 306 as a chrominance signal.

Figure 17A:
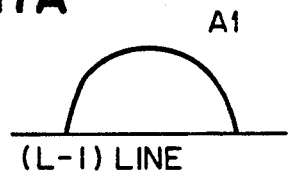
FIGS. 17A to 17E are diagrams for explaining the operation of the invention when a high-frequency signal at the current line is substantially zero and high-frequency signals before and after one line are present.
Figure 17B:
Figure 17E:
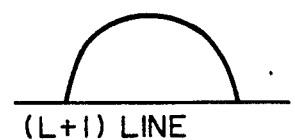
Figure 17C:
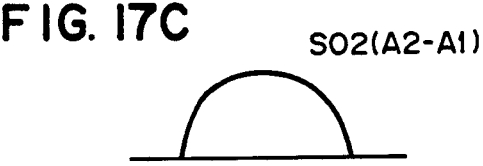
Figure 17D:
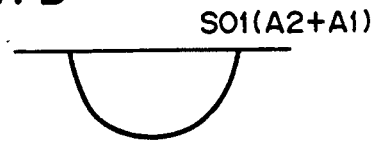
Figure 18A:
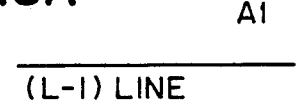
FIGS. 18A to 18E are diagrams for explaining the operation of the invention when a high-frequency signal is present at the current line and high-frequency signals before and after one line are substantially zero.
Figure 18B:
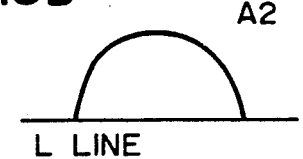
Figure 18E:
Figure 18C:
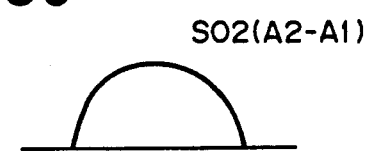
Figure 18D:
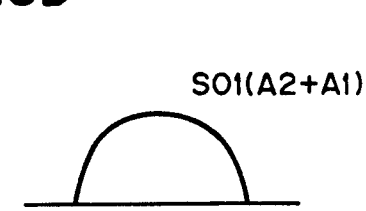
Figure 19A:
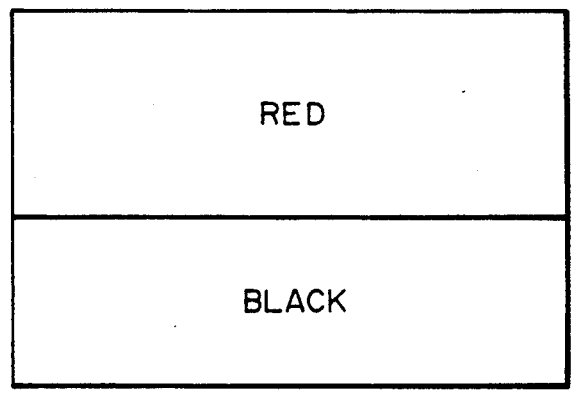
FIGS. 19A and 19B are diagrams showing exemplary input video signals.
Figure 19B:
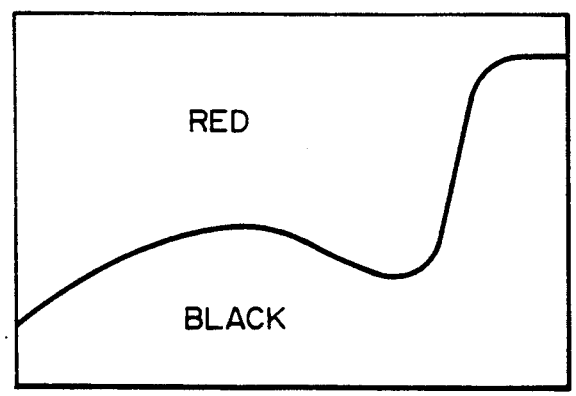
Figure 20A:
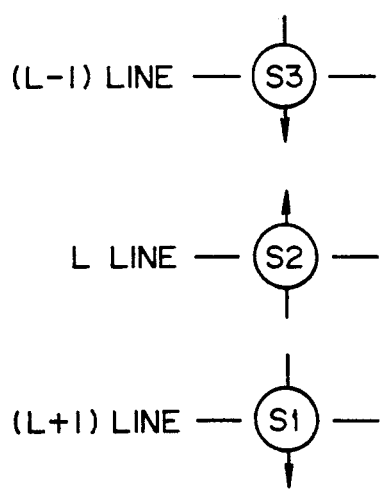
FIGS. 20A and 20B are diagrams for explaining an NTSC composite signal.
Figure 20B:
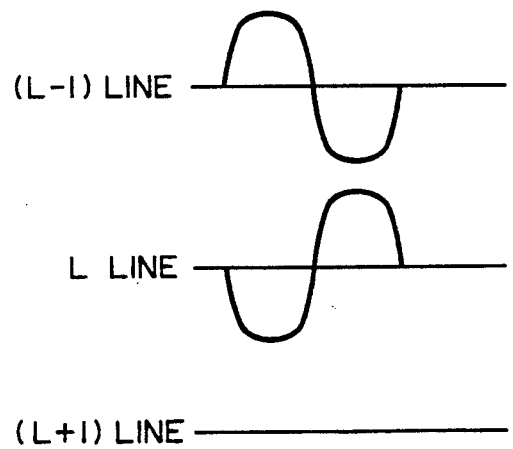
Figure 21:
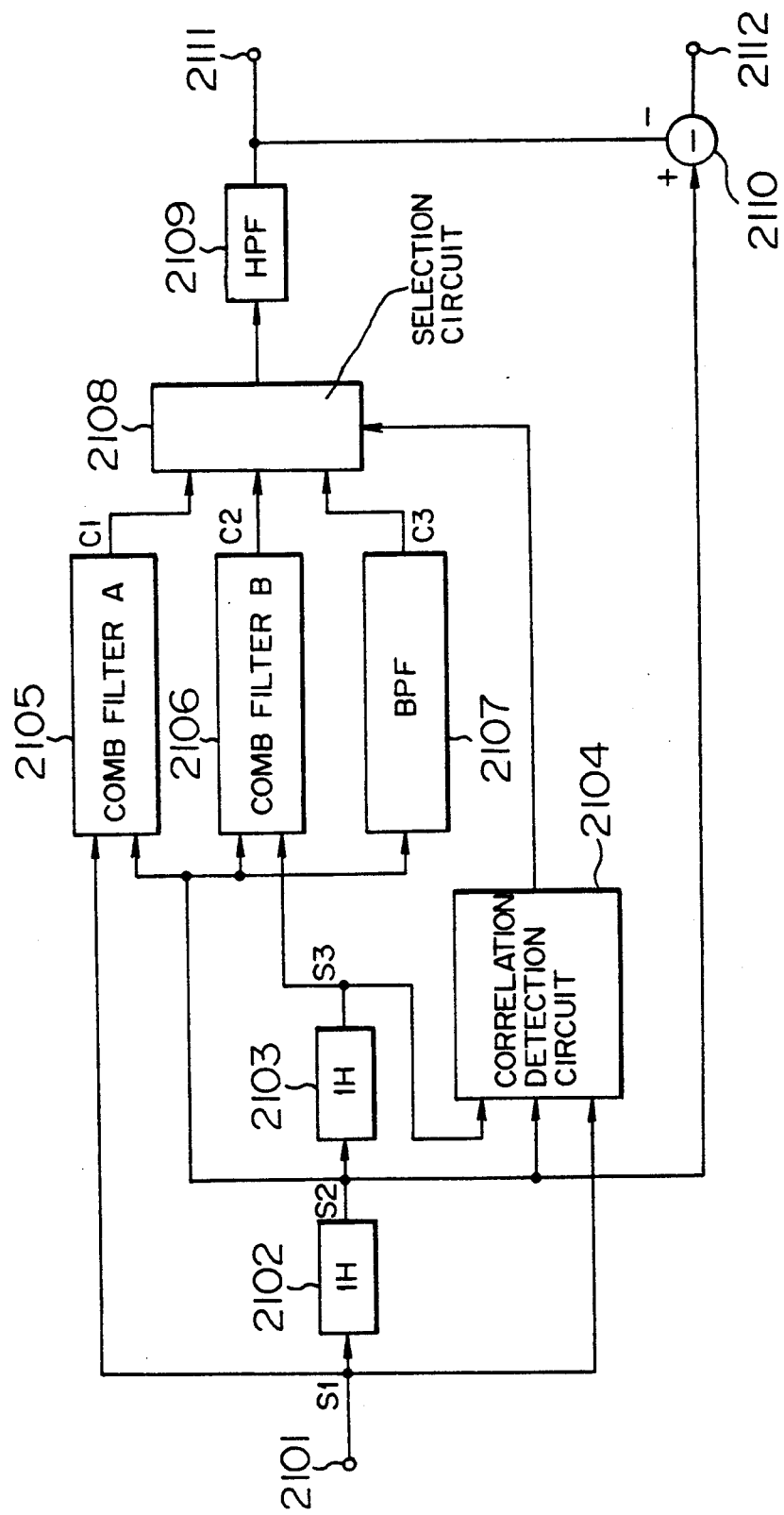
FIG. 21 is an arrangement of a first prior art luminance/chrominance separator.
Figure 22:
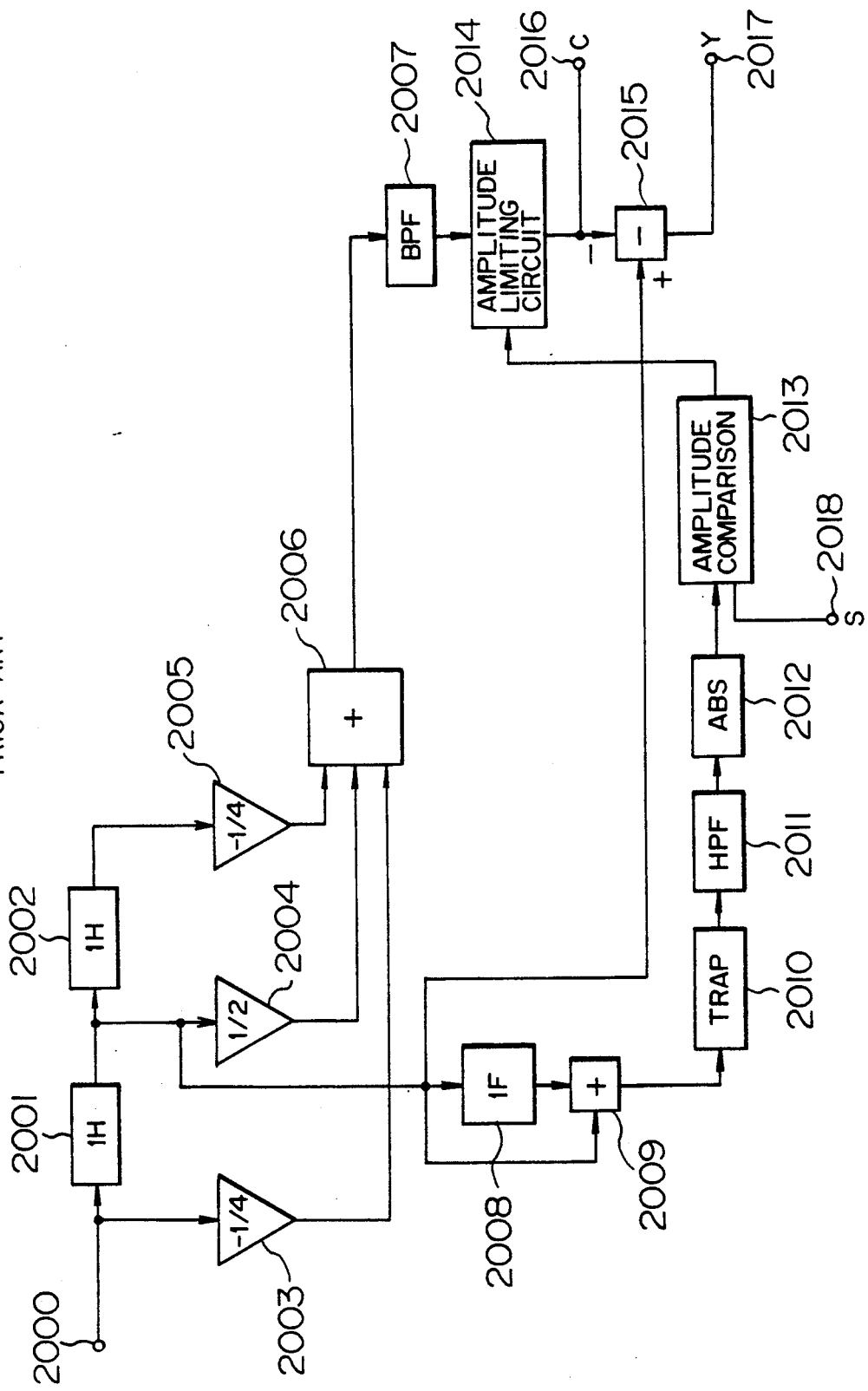
FIG. 22 is an arrangement of a second prior art luminance/chrominance separator.
Figures 23, 24, 25:
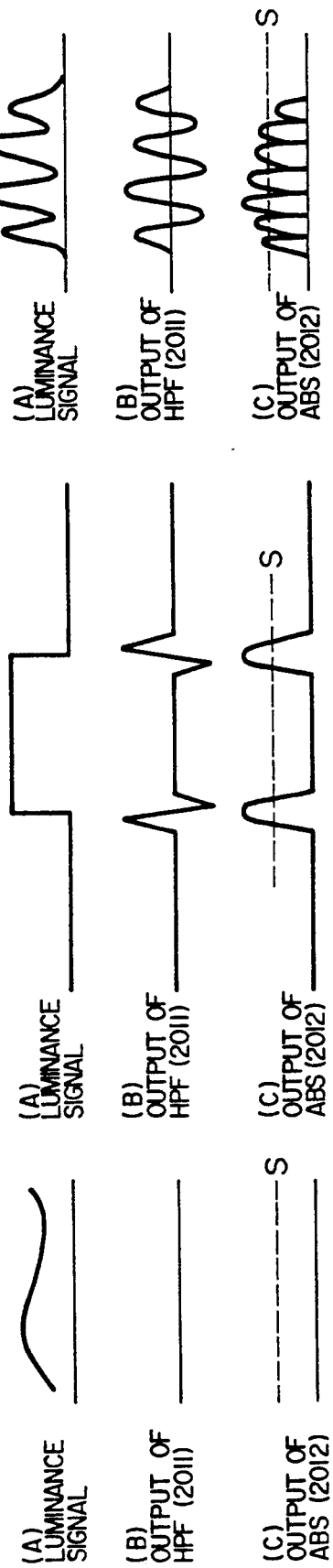
FIG. 23 shows waveforms of signals appearing in the second prior art luminance/chrominance separator.
FIG. 24 shows waveforms of signals appearing in the second prior art luminance/chrominance separator.
FIG. 25 shows waveforms of signals appearing in the second prior art luminance/chrominance separator.

The operation of the third luminance/chrominance separator will be explained by referring to FIGS. 17A to 17E and 18A to 18E, where FIGS. 17A and 18A, FIGS. 17B and 18B, . . . , FIGS. 17D and 18D show the signals A1, A2, 'so2' and 'so1' in FIG. 3 respectively.

In FIGS. 17A to 17E, the high-frequency signal A2 of FIG. 17B at the current line is substantially zero and the high-frequency signal A1 of FIG. 17A before one line is present. In such a case, the signals 'so1' and 'so2' are opposite in polarity and substantially equal to each other in absolute value as shown in FIGS. 17D and 17C. For this reason, even when the amplitude of the signal A2 is substantially zero, the magnitude relationship varies depending on the positive or negative polarity. Since the polarity change circuit 115 changes the polarity of its input signal, the correction value to be applied to the adder 104 is greatly changed.

In FIGS. 18A and 18B, the high-frequency signal A2 of FIG. 18B at the current line is present but the high-frequency signal A1 of FIG. 18A before one line is substantially zero. For this reason, the signals 'so1' and 'so2' become the same as shown in FIGS. 18D and 18C. Thus, a slight change of the amplitude or polarity of the signal A1 causes the magnitude relationship between the signals 'so1' and 'so2' to be varied so that the correction value to be applied to the adder 104 is varied greatly because the polarity change circuit 115 changes the polarity of its input signal.

In this way, when a slight change in the amplitude or polarity of the high-frequency signal causes the great change of the correction value, this has an adverse effect on the picture quality. For the purpose of avoiding this, the subtracter 322 finds a difference between the signals 'so1' and 'so2', the absolute value circuit 323 finds an absolute value of the difference, the judgement circuit 324 compares the absolute value with a certain threshold. When the output of the absolute value circuit 323 is smaller than the threshold, this adversely affects the picture quality as mentioned above. To avoid this, in this case, the switch circuit A 321 switchingly selects the prior art output 'so6' of the adaptive comb filter 320.

In this way, when the correlation is weak, a section 1 enclosed by a dotted line calculates a correction value 'so3' with respect to the output 'so4' of the comb filter; while a section 3 enclosed by a dotted line detects no correlation, in which case the luminance/chrominance separator is switched to the prior art separation system to reduce the deterioration resulting from a slant edge, etc. When the correlation is strong, the output 'so3' of the section 1 is substantially zero.

Figure 4:
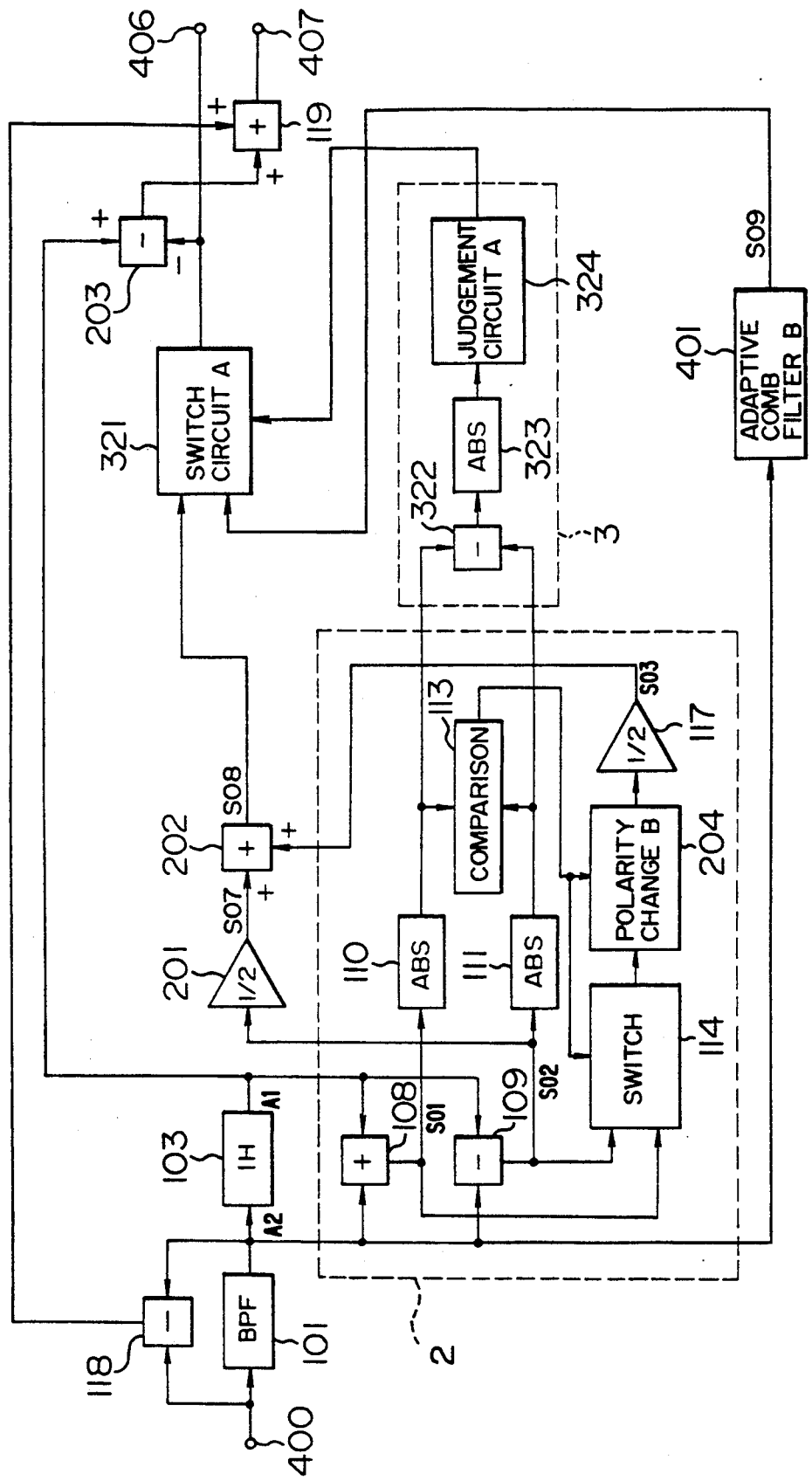
FIG. 4 shows an arrangement of a luminance/chrominance separator in accordance with a fourth embodiment of the present invention.

FIG. 4 shows a fourth luminance/chrominance separator in accordance with a fourth embodiment of the present invention, wherein parts having the same reference numerals as in FIGS. 1, 2 and 3 have the same functions and detailed explanation thereof is omitted.

The luminance/chrominance separator of FIG. 4 includes an adaptive comb filter B 401 which receives the high-frequency signal (not delayed) of the output of the BPF 101 and outputs a chrominance signal separated based on the prior art system.

In FIG. 4, a section 2, like the section 2 in FIG. 2, calculates the correction value and applies it to the adder 202. A section 3 enclosed by a dotted line like the section 3 in FIG. 3, detects the fact that a slight change in the high-frequency signal causes a great change of the correction value and thus adverse effect on the picture quality and sends a control signal to a switch circuit A 321.

With the fourth luminance/chrominance separator arranged as mentioned above, the adder 202 generates a chrominance signal obtained by correcting the chrominance signal of the output of the ¼ multiplier 201 with use of the correction value of the output of the ¼ multiplier 117 and applies the chrominance signal to the switch circuit A 321. The adaptive comb filter B 401 sends to the switch circuit A 321 the chrominance signal separated based on the prior art system. When a slight change in the high-frequency signal causes a great change of the correction value and adverse effect on the picture quality, the judgement circuit A 324, as in FIG. 3, controls the switch circuit A 321 to cause the circuit 321 to select the output of the adaptive comb filter B 401; whereas the switch circuit A 321 otherwise selects the output of the adder 202.

In this way, when the correlation is weak, the section 2 in FIG. 4 calculates the correction value 'so3' with respect to the output 'so7' of the comb filter; while the section 3 detects no correlation, in which case the luminance/chrominance separator is switched to the prior art separation system to reduce the deterioration resulting from a slant part, etc. When the correlation is strong, the output 'so3' of the section 2 in FIG. 4 is substantially zero.

Figure 5:
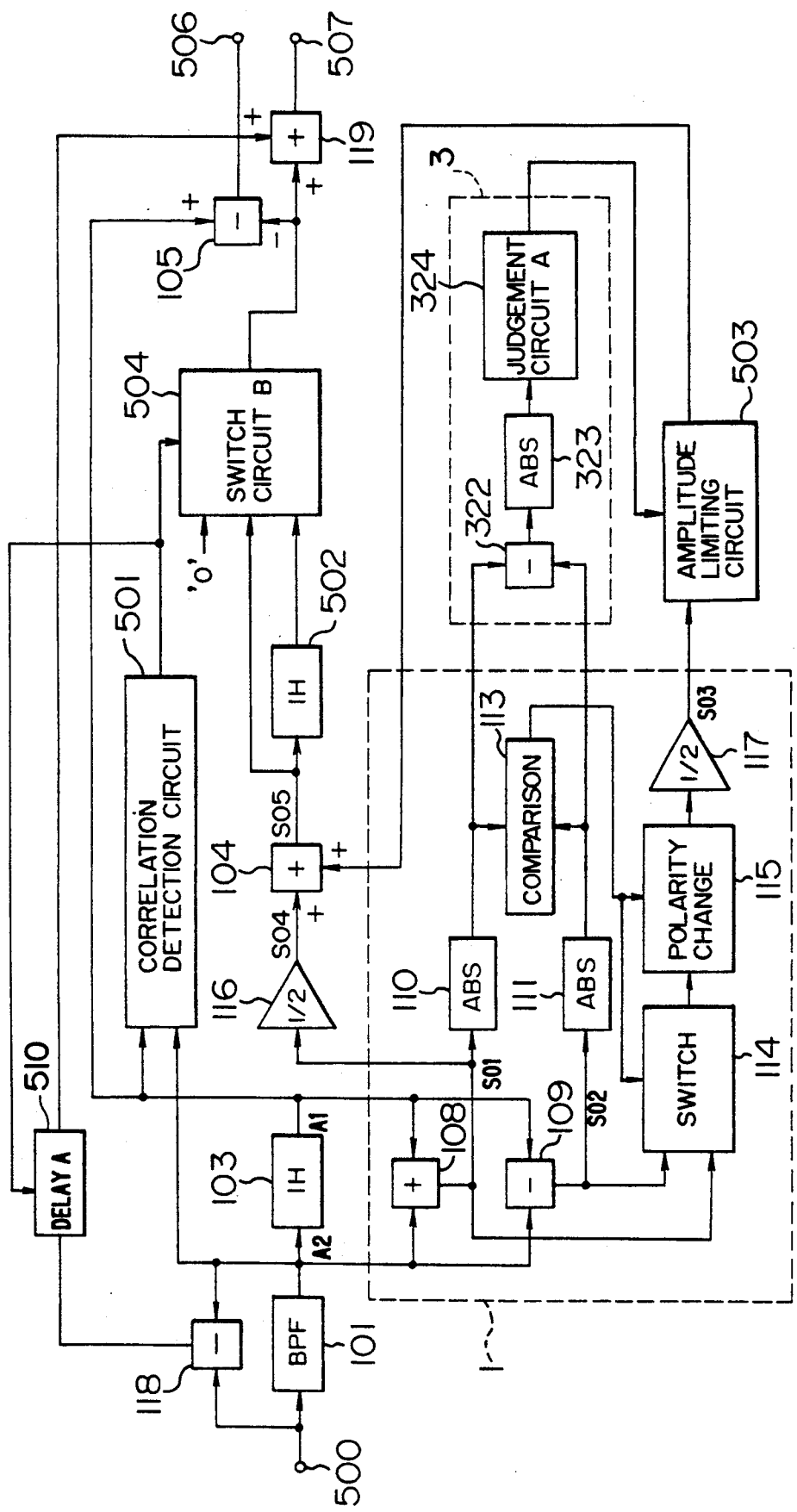
FIG. 5 shows an arrangement of a luminance/chrominance separator in accordance with a fifth embodiment of the present invention.

FIG. 5 shows an arrangement of a fifth luminance/chrominance separator in accordance with a fifth embodiment of the present invention, in which parts having the same reference numerals as in FIGS. 1, 2, 3 and 4 have the same functions and detailed explanation thereof is omitted.

The luminance/chrominance separator of FIG. 5 includes an amplitude limiting circuit 503 which limits the amplitude of the correction value as the output of the ¼ multiplier 117 and outputs a second correction value to the adder 104 under control of the output of the judgement circuit A 324. Also included in the luminance/chrominance separator are a third 1H delay 502 for delaying the output of the adder 104 by one line, a correlation detection circuit 501 for detecting the correlation of a video signal on the basis of the high-frequency signal (not delayed) as the output of the BPF 101 and the delayed high-frequency signal, and a switch circuit B 504 for switchingly selecting one of the output of the adder 104, the output of the 1H delay 202 and a certain constant value on the basis of the output of the correlation detection circuit 501. A delay circuit A 510 causes the input signal to pass through or delay by one line according to the output of the correlation detecting circuit 501.

In FIG. 5, the section enclosed by a dotted line 1, like the section 1 in FIG. 1, calculates the correction value and applies it to the amplitude limiting circuit 503. Further, when a slight change in the high-frequency signal causes a great change of the correction value and the adverse effect on the picture quality, the section enclosed by a dotted line 3, like the section 3 in FIG. 3, detects such fact and controls the amplitude limiting circuit 503 to cause the amplitude of the correction value of the input signal to become zero, thus avoiding the adverse influence on the picture quality.

The second correction value as the output of the amplitude limiting circuit 503 is added at the adder 104 to the high-frequency luminance signal of the output of the ½ multiplier 116 so that the adder 104 generates a high-frequency luminance signal with the unnecessary component removed. The output of the adder 104 is applied to the 1H delay 502 to be delayed by one line and then sent to the switch circuit B 504. The switch circuit B 504 receives the output of the adder 104 the output of the 1H delay 502 and an zero input. In this case, the zero input is the same as the output of a notch filter with respect to the luminance signal. The correlation detection circuit 501 receives the output of the BPF 101 and the output of the 1H delay 103 delayed by one line, further delays the output of the 1H delay 103 by one line therein, and detects the correlation on the basis of a total of three 3 line signals (the current line as well as its upper and lower line signals). Under the control of the detected correlation signal, the switch circuit B 504 selects one of the outputs of the adder 104 and 1H delay 502 having stronger correlation pixels. When no correlation is present for both the upper and lower line signals and the high-frequency component at the current line is very small, the switch circuit B 504 selects the zero input. Further, when no correlation is present for both the upper and lower line signals but the high-frequency signal is present at the current line, the switch circuit B 504 selects predetermined one of the outputs of the adder 104 and 1H delay 502.

The high-frequency luminance signal of the output of the switch circuit B 504 is subtracted at the subtracter 105 from the high-frequency signal and then output from a terminal 506 as a chrominance signal. A delay circuit A 510 adjusts time by delaying the output of the subtracter 118 by one line when the switch circuit B 504 selects the output of the 1H delay circuit 502. The high-frequency luminance signal is added at the adder 119 to the low-frequency signal (low-frequency luminance signal) and then output from a terminal 507 as a luminance signal. In this way, when the correlation is weak, the section 1 calculates the correction value of the comb filter, while the section 3 detects no correlation, in which case the amplitude of the correction value is limited to reduce the deterioration resulting from a slant edge, etc.

Figure 6:
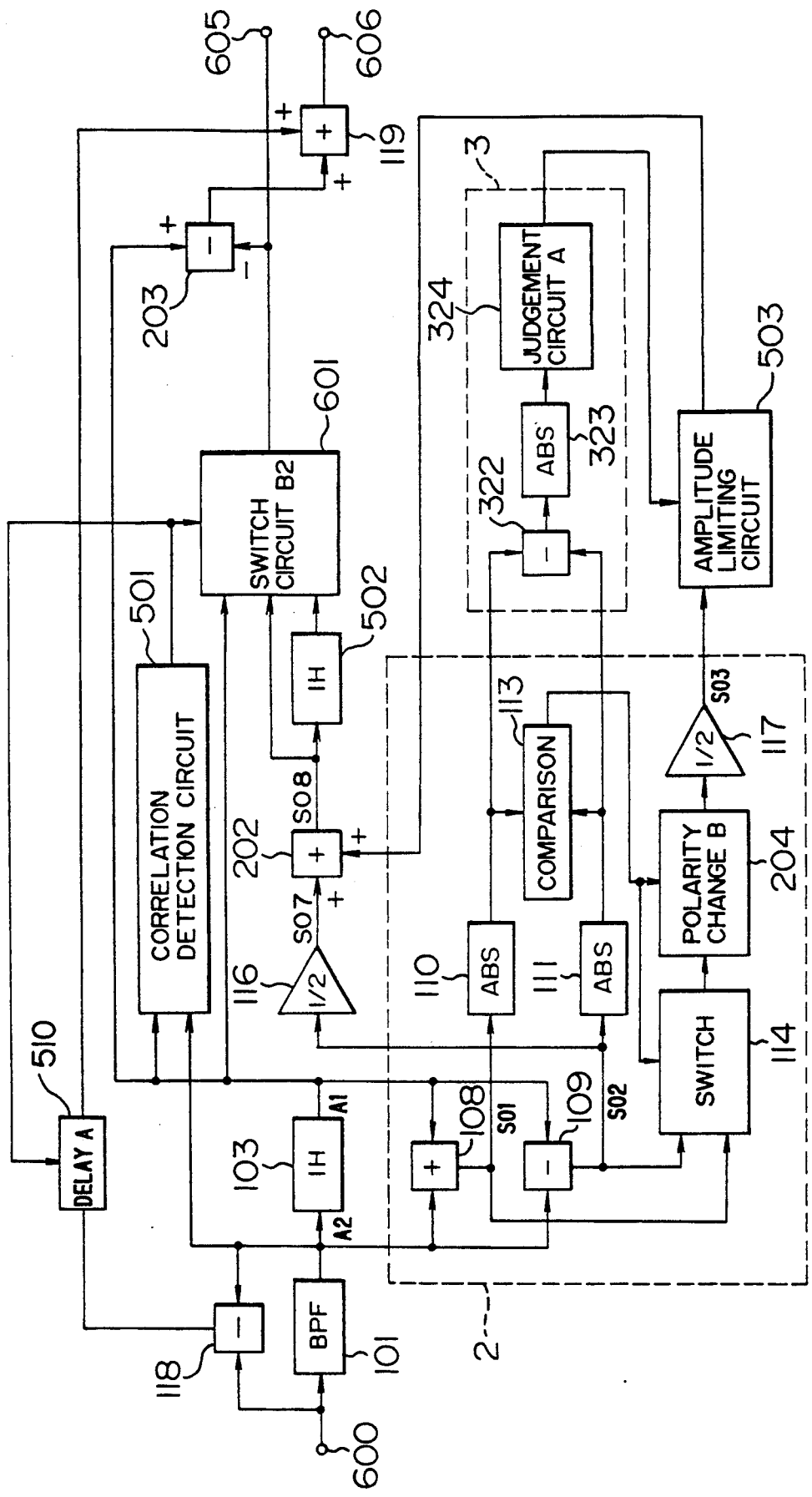
FIG. 6 shows an arrangement of a luminance/chrominance separator in accordance with a sixth embodiment of the present invention.

FIG. 6 shows a luminance/chrominance separator in accordance with a sixth embodiment of the present invention. In the drawing, parts having the same reference numerals as in FIGS. 1, 2, 3, 4, and 5 have the same functions and detailed explanation thereof is omitted.

The luminance/chrominance separator of FIG. 6 includes a switch circuit (B2) 601 which switchingly selects one of the output of the adder 202, the output of the 1H delay 502 and the output of the BPF 101 under control of the output of the correlation detection circuit 501. In FIG. 6, the chrominance signal as the output of the ½ multiplier 116 is added at the adder 202 to the second correction value of the output of the amplitude limiting circuit 503 to eliminate the unnecessary component therefrom.

The chrominance signal of the output of the adder 202 is applied to the second one-line delay 502 so that the switch (B2) 601 selects one of the delayed chrominance signal and the no delayed chrominance signal having stronger correlative pixels under control of the output of the correlation detection circuit 501. When the upper and lower line signals have both no correlation, the switch circuit 601 selects the output of the BPF 101. The HPF 101 comprises a band pass filter for the chrominance signal.

In this way, when the correlation is weak, a section enclosed by a dotted line 2 calculates a correction value for the output of the comb filter. When the section 3 detects no correlation, the amplitude of the correction value is limited to reduce the deterioration resulting from a slant edge, etc.

Figure 7:
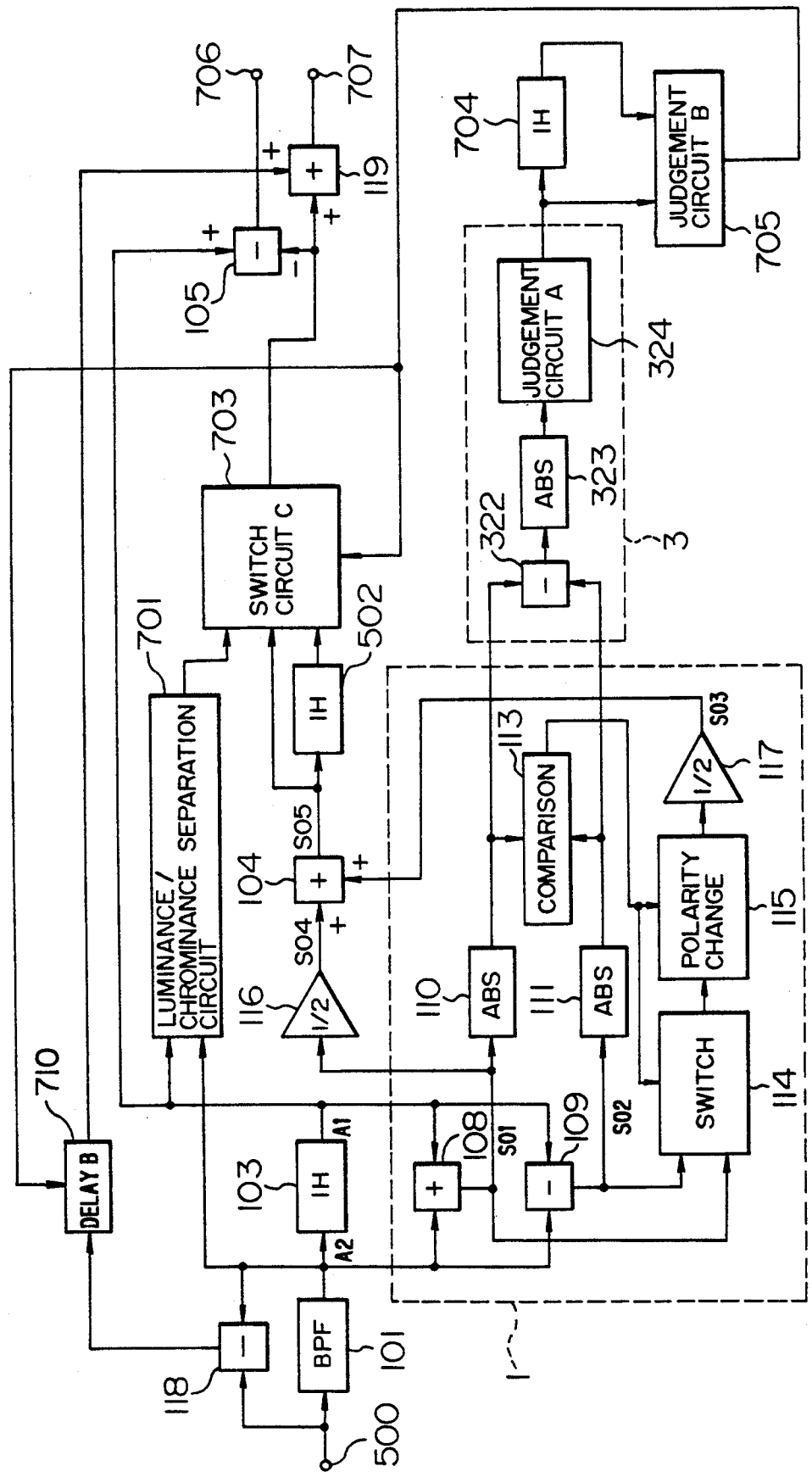
FIG. 7 shows an arrangement of a luminance/chrominance separator in accordance with a seventh embodiment of the present invention.

FIG. 7 shows an arrangement of a seventh luminance/chrominance separator in accordance with a seventh embodiment of the present invention, wherein parts having the same reference numerals as in FIGS. 1 to 6 have the same functions and detailed explanation thereof is omitted.

In FIG. 7, a luminance/chrominance separation circuit 701 receives the not-delayed high-frequency signal of the output of the BPF 101 and the delayed high-frequency signal of the output of the 1H delay 103 and separates the luminance signal from the chrominance signal and sends the separated luminance signal to a switch circuit C 703. The switch circuit C 703 receives, in addition to the luminance signal of the output of the second luminance/chrominance separation circuit 701, the output of the adder 104 and the output of the 1H delay 502. A 1H delay 704 delays the output of the judgement circuit A 324 by one line, and a judgement circuit B 705 judges the output of the judgement circuit A and the output of the 1H delay 704 and sends a control signal to the switch circuit C 703 to cause the switch circuit C 703 to select one of the input signals under control of the control signal received from the judgement circuit B. A delay circuit B 710 causes the input signal thereof to pass through or delay by one line according to the output of the judgement circuit 704.

With the seventh luminance/chrominance separator arranged as mentioned above, the section enclosed by the dotted line 1 calculates the correction value and outputs it to the adder 104 as in the section 1 in FIG. 1. The output of the ½ multiplier 116 corresponds to the high-frequency luminance signal which is sent to the adder 104 to remove the unnecessary component therefrom with use of the correction value of the output of the ½ multiplier 117. The unnecessary-component-removed signal is sent from the adder 104 to the 1H delay 502. The switch circuit C 703 receives the output of the 1-line delay 502, the output of the adder 104 and the output of the second luminance/chrominance separation circuit 701.

A section 3 enclosed by a dotted line, like the section 3 in FIG. 3, detects that a large change in the correction value causes the adverse influence on the picture quality, and sends a signal indicative of the detection result to the 1H delay 704 and also to the judgement circuit B 705. The judgement circuit B 705 receives the not delayed signal of the judgement circuit A 324 and the delayed output of the 1H delay. The judgement circuit B 705 sends the control signal to the switch circuit C 703 to controllably cause the switch circuit C 703 to select the output of the adder 104 when the not-delayed detection result have no adverse effect on the picture quality and to select the output of the 1H delay 502 when the delayed detection result have no adverse effect on the picture quality and to select the output of the luminance/chrominance separation circuit 701 when both the delayed and not-delayed detection results have no adverse effect on the picture quality.

The operation of the luminance/chrominance separation circuit 701 will be explained with reference to FIGS. 17A to 17E and 18A to 18E, where FIGS. 17B and 18B represent the current line signal, FIGS. 17A and 18A represents a signal before one line and FIGS. 17E and 18E represents a signal after one line.

When both of the signals before and after the current line have no correlation and the correction value greatly varies, for example, when the high-frequency signal of the current line is substantially zero as shown in FIG. 17B, the high-frequency signal after one line is present as shown in FIG. 17E. In such a case, these signals are high-frequency luminance signals and the luminance/chrominance separation circuit 701 outputs the current line signal as the luminance signal.

When the high-frequency signal of the current line is present as shown in FIG. 18B, the high-frequency signal after one line is substantially zero. In such a case, the luminance signal is present and the second luminance/chrominance separation circuit 701 outputs the current line signal as it is or outputs the output of the comb filter as the high-frequency luminance signal. In this way, when the correlation is weak, the section 1 calculates the correction value for the output of the comb filter. When no correlation is present over 2 lines, the second luminance/chrominance separation circuit outputs the high-frequency signal of the current line when the high-frequency signal of the current line is very small and outputs the output of the comb filter or the high-frequency signal of the original line when the high-frequency signal is not small, whereby the deterioration resulting from a slant edge, etc. is reduced. A delay circuit B 710 adjusts time by delaying the output of the subtracter 118 by one line when the switch circuit C 703 selects the output of the second luminance/chrominance separation circuit 701 or the output of the 1H delay 502.

Figure 8:
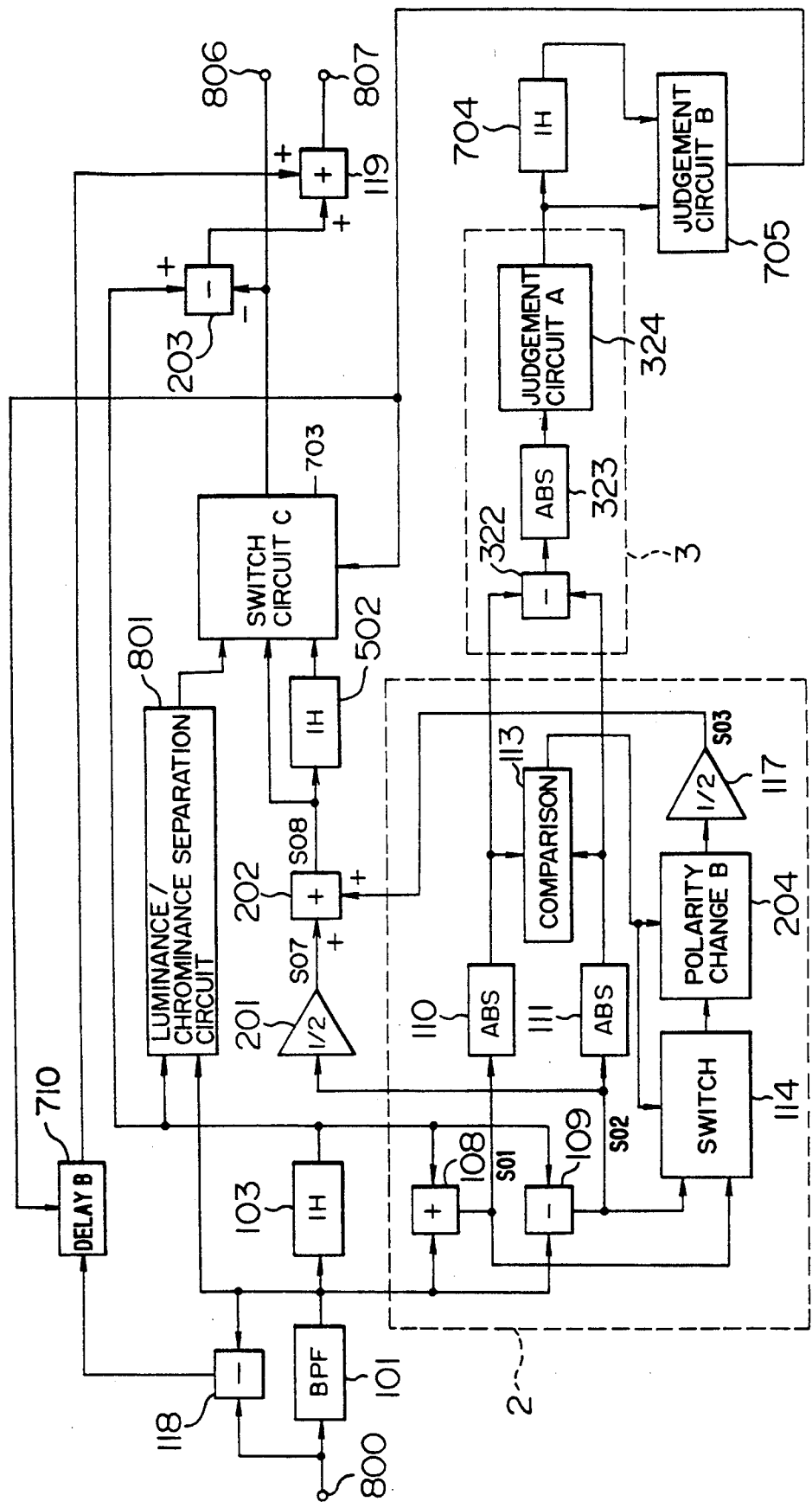
FIG. 8 shows an arrangement of a luminance/chrominance separator in accordance with an eighth embodiment of the present invention.

FIG. 8 shows an arrangement of an eighth luminance/chrominance separator in accordance with an eighth embodiment of the present invention, in which parts having the same reference numerals as in FIGS. 1, 2, 3, 4, 5, 6 and 7 have the same functions and detailed explanation thereof is omitted.

The luminance/chrominance separator of FIG. 8 includes a luminance/chrominance separation circuit 801 which receives the not-delayed high-frequency signal as the output of the BPF 101 and the delayed high-frequency signal as the output of the 1H delay 103, separates the luminance signal and the chrominance signal therefrom, and sends the separated chrominance signal to the switch circuit C703. The switch circuit C 703, as in FIG. 7, the output of the luminance/chrominance separation circuit 801, the corrected chrominance signal of the output of the adder 202, and the corrected chrominance signal delayed by one horizontal period as the output of the 1H delay 502. The switch circuit C is switched under control of the output of the judgement circuit B 705.

In the arrangement of FIG. 8, the section enclosed by the dotted line 2, like the section 2 in FIG. 2, calculates the correction value and applies it to the adder 202 to correct the chrominance signal of the output of the ½ multiplier 201. The section enclosed by the dotted line 3, like the section 3 in FIG. 4, detects that a slight change in the high-frequency signal causes a large change of the correction value and the adverse effect on the picture quality, and sends its detection result to the 1H delay 704 and also to the judgement circuit B 705. The judgement circuit B 705 also receives the output of the 1H delay 704 corresponding to the detection result of the section 3 delayed by one horizontal period. The judgement circuit B 705 sends the control signal to the switch circuit C 703 to controllably cause the switch circuit 703, as in FIG. 7, to select the output of the adder 202 when the not-delayed detection result has no adverse effect on the picture quality and to select the output of the 1H delay 502 when the delayed detection result has no adverse effect on the picture quality and to select the output of the luminance/chrominance separation circuit 801 when both of the delayed and not-delayed detection results have an adverse effect on the picture quality.

Explanation of the luminance/chrominance separation circuit 801 will be made by referring to FIGS. 17A to 17E and 18A to 18E, where FIGS. 17B and 18B represents a signal of the current line, FIGS. 17A and 18A represents a signal before one line and FIGS. 17E and 18E represents a signal after one line, respectively.

When both of the signals before and after the current line have no correlation and the correction value greatly varies, for example, when the high-frequency signal of the current line is substantially zero as shown in FIG. 17B, the high-frequency signal after one line is present as shown in FIG. 17E. In such a case, these signals are high-frequency luminance signals and the luminance/chrominance separation circuit 801 judges the absence of the chrominance signal and outputs the high-frequency signal of this line as chrominance signal.

When the high-frequency signal of the current line is present as shown in FIG. 18B, the high-frequency signal after one line is substantially zero. In such a case, the chrominance signal is present and the third luminance/chrominance separation circuit 801 outputs the current line signal as it is or outputs the output of the comb filter as the chrominance signal. In this way, when the correlation is weak, the section 2 calculates the correction value for the output of the comb filter and the section 3 detects the no correlation. When no correlation is present over 2 lines, the luminance/chrominance separation circuit outputs the high-frequency signal of the current line when the high-frequency signal of the current line is very small, and outputs the output of the comb filter or the high-frequency signal of the current line when the high-frequency signal is not small, whereby the deterioration resulting from a slant edge, etc. is reduced.

Figure 9:
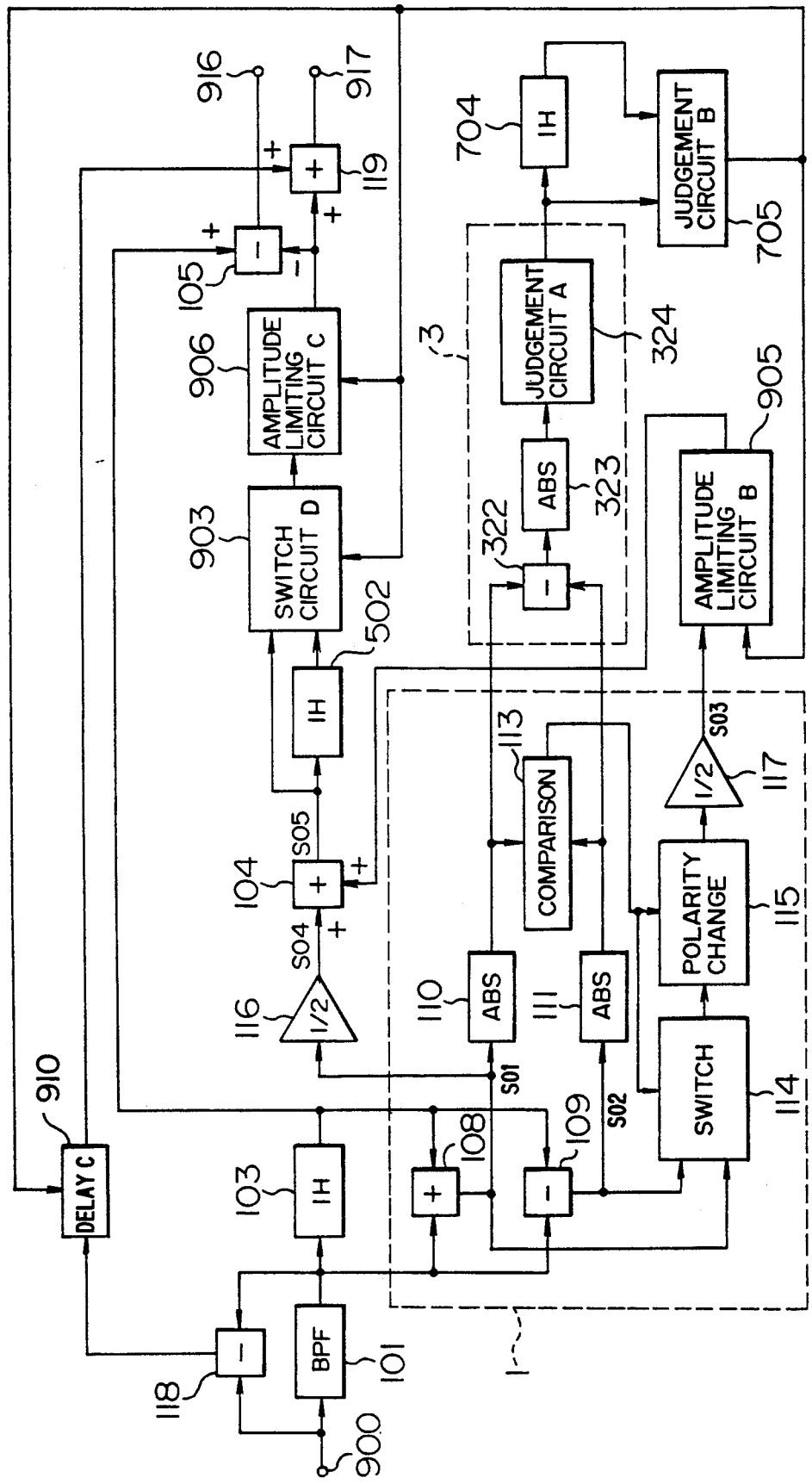
FIG. 9 shows an arrangement of a luminance/chrominance separator in accordance with a ninth embodiment of the present invention.

FIG. 9 shows an arrangement of a ninth luminance/chrominance separator in accordance with a ninth embodiment of the present invention, in which parts having the same reference numerals as in FIGS. 1, 2, 3, 4, 5, 6, 7 and 8 have the same functions and detailed explanation thereof is omitted.

In FIG. 9, an amplitude limiting circuit B 905 limits the amplitude of the correction signal issued from the polarity change circuit 115 and outputs a second correction signal to the adder 104 under control of the output of the judgement circuit B 705. A switch circuit D 903 receives the output of the adder 104 and the output of the 1H delay 502 and selects one of its input signals under control of the control signal corresponding to the output of the judgement circuit B 705. An amplitude limiting circuit C 906 limits the output of the switch circuit D 903 under control of the control signal corresponding to the output of the judgement circuit B 705. A delay circuit C 910 causes the input signal to pass through or delays by one line according to the output of the judgement circuit B 705.

With the ninth luminance/chrominance separator arranged as mentioned above, the section enclosed by the dotted line 1, like the section 1 in FIG. 1, calculates the correction value and outputs it to the amplitude limiting circuit B 905. The one-line delay 704 and the judgement circuit B 705 have the same functions as those in FIG. 3. The ½ multiplier 116, as in FIG. 1, outputs the high-frequency luminance signal and the adder 104 receives the correction value of the ½ multiplier 117 to remove the unnecessary component from the high-frequency luminance signal and applies the unnecessary-component-removed high-frequency luminance signal to the 1H delay 502. The switch circuit D 903 receives the output of the 1H delay 502 and the output of the adder 104.

The subtracter 322, the absolute value circuit 323, judgement circuit 324, 1H delay 704 and judgement circuit B 705 have the same functions as those in FIG. 7 to detect that the signals before and after the current line have an adverse effect on the picture quality. When the judgement circuit B 705 judges that the signals before and after the current line have an adverse effect on the picture quality, the output of the amplitude limiting circuit B 905 is sent as the correction value to the adder 104 to be added to the output of the comb filter.

The switch circuit D 903 switchingly selects one of the output of the adder 104 and the output of the 1H delay 502 under control of the output of the judgement circuit B 705. For example, when the current line signal and the signal before one line with respect thereto cause a large change of the correction value, the switch circuit D 903 selects the output (output of the comb filter using the signal after one line from the current line) of the adder 104; whereas, when the current line signal and the signal after one line cause a large change of the correction value the switch circuit C 903 selects the output (output of the comb filter using the current signal and the signal before one line) of the 1H delay 502. When both of the signals before and after one line have an adverse effect on the picture quality, the switch circuit D 903 selects predetermined one of its input signals.

The output of the switch circuit D 903 is applied to the amplitude limiting circuit C 906. The amplitude limiting circuit C 906 receives the high-frequency signal of the current line of the output of the 1H delay 502 and the output of the judgement circuit B 705. When the judgement circuit B 705 judges that the signals before and after one line both have an adverse effect on the picture quality, the amplitude limiting circuit C 906 limits the output of the switch circuit D 903 to the level of the high-frequency signal of the current line issued from the 1H delay 502. A delay circuit C 910 adjusts time by delaying the output of the subtracter 118 by one line when the switch circuit D 903 selects the output of the 1H delay 502.

When the judgement circuit B 705 judges that a large change in the correction value after and before one line with respect to the current line has an adverse effect on the picture quality, the then operation of the amplitude limiting circuit B 905 and amplitude limiting circuit C 906 will be explained with reference to FIGS. 17A-E and 18A-E.

In the case of FIGS. 18A-18E, the (L-1) and (L+1) line signals are substantially zero and the current line signal has a high-frequency signal. In this case, the correction value becomes zero at the amplitude limiting circuit B 905 and the switch circuit D 903 outputs the comb filter output of either line. Further, since the comb filter output is smaller than the high-frequency signal of the current line, it passes through the amplitude limiting circuit C 906.

In the case of FIGS. 17A-17E, the current line signal is substantially zero and the signals before and after one line with respect to the current line are present. In this case, the output of the switch circuit D 903 is suppressed substantially to zero through the amplitude limiting circuit C 906. In this way, when the correlation is weak, the section enclosed by the dotted line 1 calculates the correction value for the output of the comb filter, and the section enclosed by the dotted line 3 detects no correlation. When no correlation is present over 2 lines, the amplitude limiting circuit B 905 suppresses the correction values and the amplitude limiting circuit C 906 further suppresses the separated luminance signal, thus reducing the deterioration resulting from a slant edge, etc.

Figure 10:
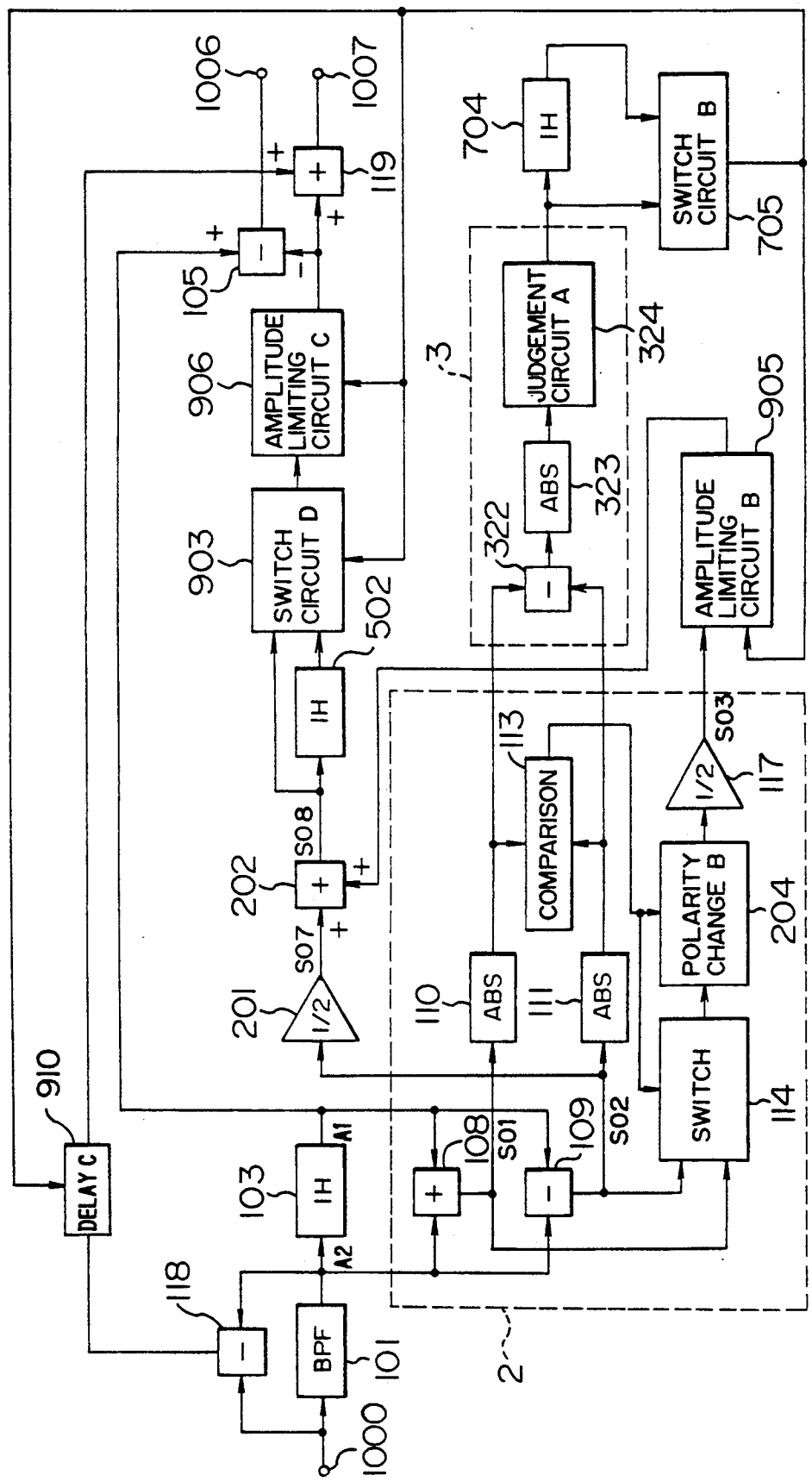
FIG. 10 shows an arrangement of a luminance/chrominance separator in accordance with a tenth embodiment of the present invention.

FIG. 10 is an arrangement of a tenth luminance/chrominance separator in accordance with a tenth embodiment of the present invention, in which parts having the same reference numerals as those in FIGS. 1, 2, 3, 4, 5, 6, 7, 8 and 9 have the same functions and detailed explanation thereof is omitted herein.

With the tenth luminance/chrominance separator arranged as mentioned above, the section enclosed by the dotted line 2, like the section 2 in FIG. 2, calculates the correction values and outputs it to the amplitude limiting circuit B 905. The one-line delay 704 and the judgement circuit A 324 have the same functions as those in FIG. 3. The ½ multiplier 201, as in FIG. 2, outputs the chrominance signal, while the adder 202 removes the unnecessary component from the chrominance signal with use of the correction value of the amplitude limiting circuit B 905 then sends it to the 1H delay 502. The switch circuit D 903 receives as its inputs the output of the 1H delay 502 and the output of the adder 202.

The subtracter 322, absolute value circuit 323, judgement circuit 324, 1H delay 704 and judgement circuit B 705 have substantially the same functions as those in FIG. 7 to detect that the signals before and after one line with respect to the current line have an adverse effect on the picture quality. When the judgement circuit B 705 judges that the signals before and after one line with respect to the current line have an adverse effect on the picture quality, the output of the amplitude limiting circuit B 905 is added as the correction value at the adder 202 to be added to the output of the comb filter.

The switch circuit D 903 switchingly selects one of the output of the adder 202 and the output of the 1H delay 502 according to the output of the judgement circuit B 705. For example, when the signals of the current line and before one line therefrom cause a large change of the correction value, the switch circuit D 903 selects the output (output of the comb filter using the signals of the current line and after one line therefrom) of the adder 202; whereas, when the signals of the current line and after one line therefrom cause a large change of the correction value, the switch circuit D 903 selects the output (output of the comb filter using the signals of the current line and before one line therefrom) of the 1H delay 502. Further, when both of the signals before and after one line from the current line have an adverse effect on the picture quality, the switch circuit D 903 selects predetermined one of the two input signals.

Further, the output of the switch circuit D 903 is applied to the amplitude limiting circuit C 906. The amplitude limiting circuit C 906 receives as its inputs the output of the switch circuit D 903 and the output of the judgement circuit B 705. When the judgement circuit B 705 judges that both of the signals before and after one line with respect to the current line have an adverse effect on the picture quality, the amplitude limiting circuit C 906 limits the output of the switch circuit D 903 to the level of the high-frequency signal of the current line of the output of the 1H delay 502.

When the judgement circuit B 705 judges that the signals before and after one line from the current line cause a large change of the correction value and the adverse effect on the picture quality, the then operation of the amplitude limiting circuits B 905 and C 906 will be explained by referring to FIGS. 17A to 17E and 18A to 18E.

As shown in FIGS. 18A and 18E, the signals of the (L−1) and (L+1) lines are substantially zero and the current line signal contains a high-frequency signal as shown in FIG. 18B. In this case, the correction value becomes zero at the amplitude limiting circuit B 905 and the switch circuit D 903 generates the comb filter output of either line. Further, since the comb filter output is smaller than the high-frequency signal of the current line, it passes through the amplitude limiting circuit C 906.

As shown in FIGS. 17A, 17B and 17E, the current line signal is substantially zero and the signals before and after one line with respect to the current line are present. In this case, the output of the switch circuit D 903 is suppressed substantially to zero through the amplitude limiting circuit C 906. In this way, when the correlation is weak, the section enclosed by the dotted line 2 calculates the correction value for the output of the comb filter, and the section enclosed by the dotted line 3 detects no correlation. When no correlation is present over 2 lines, the amplitude limiting circuit B 905 suppresses the correction values and the amplitude limiting circuit C 906 further suppresses the separated luminance signal, thus reducing the deterioration resulting from a slant edge, etc.

Figure 11:
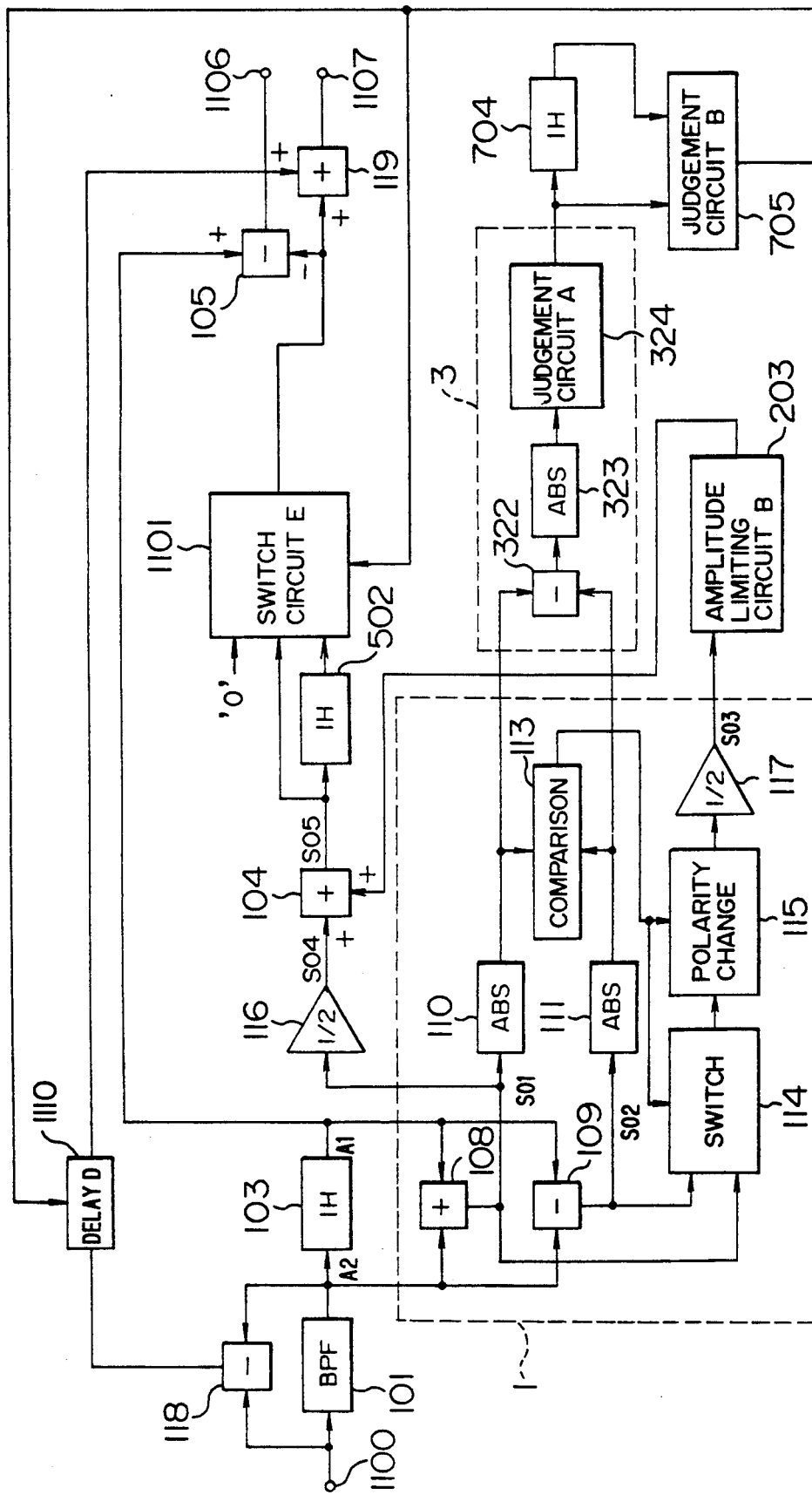
FIG. 11 shows an arrangement of a luminance/chrominance separator in accordance with an eleventh embodiment of the present invention.

FIG. 11 is an arrangement of an eleventh luminance/chrominance separator in accordance with an eleventh embodiment of the present invention, in which parts having the same reference numerals as those in FIGS. 1, 2, 3, 4, 5, 6, 7, 8, 9 and 10 have the same functions and detailed explanation thereof is omitted herein.

In FIG. 11, a switch circuit E 1101 receives as its inputs the output of the adder 104 and the output of the 1H delay 502 and selects one of the input signals under control of the control signal corresponding to the output of the judgement circuit B 705. A delay circuit D 1110 causes the input signal to pass through or delays by one line according to the output of the judgement circuit B 705.

With the eleventh luminance/chrominance separator arranged as mentioned above, the section enclosed by the dotted line 1 calculates the correction value and applies its output to the amplitude limiting circuit 203, as in FIG. 1. The 1H delay 704 and the judgement circuit B 705 have substantially the same functions as those in FIG. 7.

Further, the section enclosed by the dotted line 3, as in FIG. 3, also detects that a large change in the correction value has an adverse effect on the picture quality and applies its output to the 1H delay 704. And the detection result delayed by on line and the detection result not delayed are applied to the judgement circuit B 705.

The amplitude limiting circuit 203, as in FIG. 4, when the judgement circuit A 324 judges that the correction value is greatly changed, limits the amplitude of its input signal to zero and applies its output to the adder 104 as the correction value. The corrected luminance signal as the output of the adder 104 is sent to the 1H delay 502 for one line delay and then to the switch circuit E 1101 as its one input. The corrected luminance signal of the adder 104 is also applied directly to the switch circuit E 1101 as another input. The switch circuit E 1101 switchingly selects one of its input signals in the following manner according to the judgement result of the judgement circuit B 705.

When the signals of the current line and before one line therefrom have an adverse effect on the picture quality, the switch circuit E 1101 selects the output of the adder 104 corresponding to the output of the comb filter based on the signals of the current line and after one line therefrom. When the signals of the current line and after one line therefrom have an adverse effect on the picture quality, the switch circuit E 1101 selects the output of the 1H delay 502 receiving the output of the comb filter based on the signals of the current line and before one line therefrom. Further, when both of the signals before and after one line have an adverse effect on the picture quality, the switch circuit E 1101 selects the zero input. In the system of FIG. 11, the judgement circuit B 705 is used in place of the correlation detection circuit 501 in FIG. 5 to provide substantially the same effect as FIG. 5. A delay circuit D 1110 adjusts time by delaying the output of the subtracter 118 by one line when the switch circuit E 1101 selects the output of the 1H delay 502.

Figure 12:
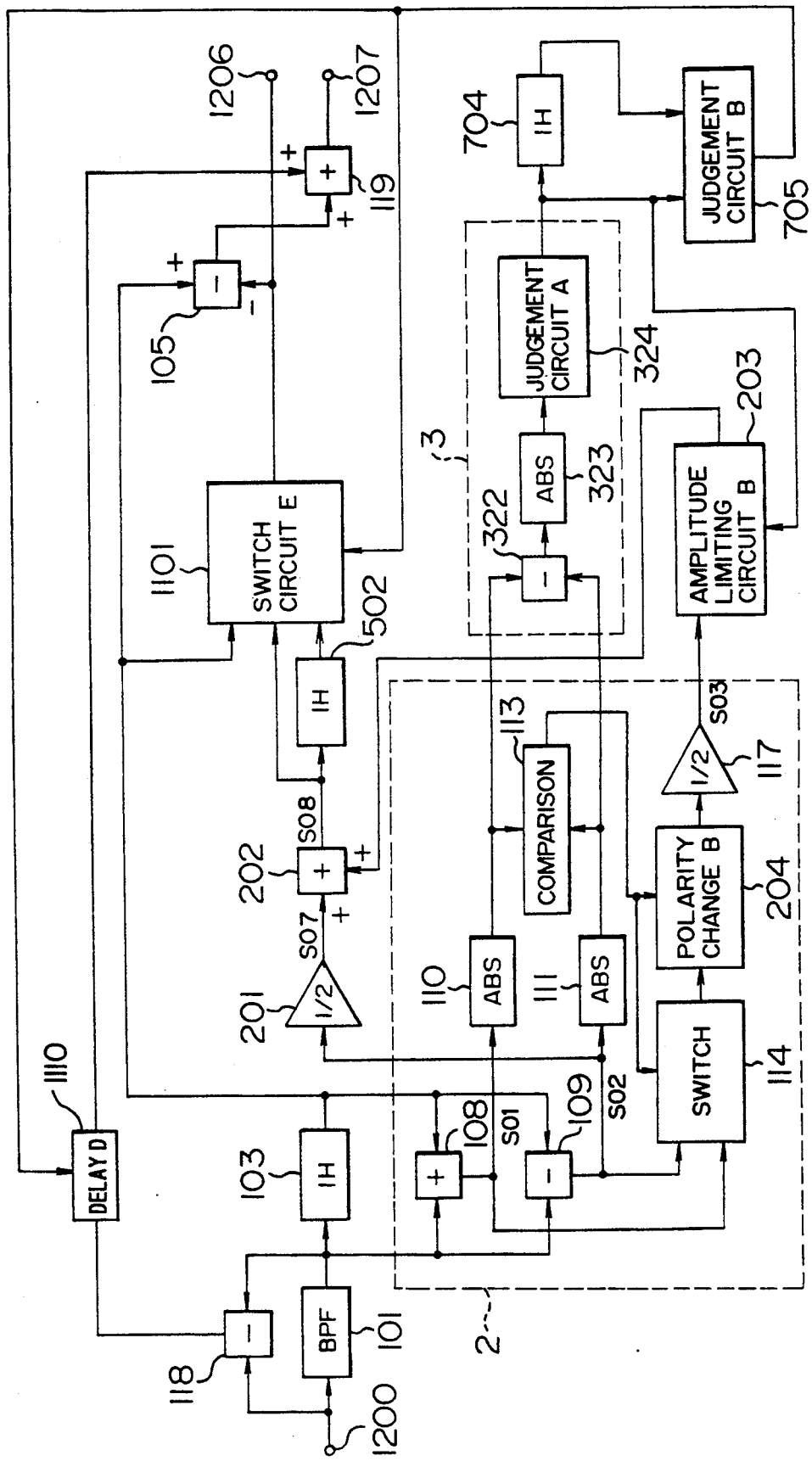
FIG. 12 shows an arrangement of a luminance/chrominance separator in accordance with a twelfth embodiment of the present invention.

FIG. 12 is an arrangement of a twelfth luminance/chrominance separator in accordance with a twelfth embodiment of the present invention, in which parts having the same reference numerals as those in FIGS. 1, 2, 3, 4, 5, 6, 7, 8, 9, 10 and 11 have the same functions and detailed explanation thereof is omitted herein.

With the twelfth luminance/chrominance separator arranged as mentioned above, the section enclosed by the dotted line 2 calculates the correction value and applies its output to the amplitude limiting circuit 203 as in FIG. 6. The 1H delay 704 and the judgement circuit B 705 have substantially the same functions as those in FIG. 7.

The section enclosed by the dotted line 3 detects that a large change in the correction values has an adverse effect on the picture quality and applies its output to the 1H delay 704, as in FIG. 3. And the detection result delayed one line and the detection result not delayed are applied to the judgement circuit B 705.

The amplitude limiting circuit 203, as in FIG. 4, when the judgement circuit A 324 judges that the correction value is greatly changed, limits the amplitude of its input signal to zero and applies its output to the adder 202 as the correction value. The corrected chrominance signal as the output of the adder 202 is sent to the 1H delay 502 for one line delay and then to the switch circuit E 1101 as its one input. The corrected luminance signal of the adder 104 is also applied directly to the switch circuit E 1101 as another input. The switch circuit E 1101 receives as another input the output of the 1H delay 103 which has been the zero input in FIG. 11.

The switch circuit E 1101 selects one of its input signals in the following manner according to the judgement result of the judgement circuit B 705.

When the signals of the current line and before one line therefrom have an adverse effect on the picture quality, the switch circuit E 1101 selects the output of the adder 202 corresponding to the output of the comb filter based on the signals of the current line and after one line therefrom. When the signals of the current line and after one line therefrom have an adverse effect on the picture quality, the switch circuit E 1101 selects the output of the 1H delay 502 receiving the output of the comb filter based on the signals of the current line and before one line therefrom. Further, when both of the signals before and after one line have an adverse effect on the picture quality, the switch circuit E 1101 selects the high-frequency signal of the output of the 1H delay 103. In the system of FIG. 12, the judgement circuit B 705 is used in place of the correlation detection circuit 501 in FIG. 6 to provide substantially the same effect as FIG. 6.

What is claimed is:

1. A luminance/chrominance separator comprising:
   a first filter for separating a high-frequency signal from a composite video signal and outputting said high-frequency signal;
   a first delay circuit, receiving said high-frequency signal, for delaying said high-frequency signal by one horizontal period and outputting a delayed high-frequency signal;
   a first adder, receiving said high-frequency signal and said delayed high-frequency signal, for finding a sum signal by summing said high-frequency signal and said delayed high-frequency signal of a current processing scanning line;
   a first subtracter, receiving said high-frequency signal and said delayed high-frequency signal, for finding a difference signal by calculating a difference between said high-frequency signal and said delayed high-frequency signal;
   a first absolute value circuit, receiving said sum signal, for finding an absolute value of said sum signal;
   a second absolute value circuit, receiving said difference signal, for finding an absolute value of said difference signal;
   a correction value calculation circuit for finding a correction signal based on said sum signal and said difference signal in accordance with an absolute value magnitude relationship between said sum and difference signals;
   a comb filter for separating a luminance signal and a chrominance signal from said high-frequency signal and said delayed high-frequency signal delayed by one horizontal period; and
   a correction circuit for removing an unnecessary component contained in an output of said comb filter in accordance with said correction signal.

2. A luminance/chrominance separator as set forth in claim 1, further comprising:
   a second delay circuit for delaying said delayed high-frequency signal of said first delay circuit by one horizontal period;
   a first comb filter for separating a luminance signal from a chrominance signal on the basis of said composite video signal and said delayed high-frequency signal of said first delay circuit;
   a second comb filter for separating the luminance signal from the chrominance signal on the basis of said delayed high-frequency signal of said first delay circuit and an output of said second delay circuit;
   a band pass filter for separating the luminance signal from the chrominance signal on the basis of said delayed high-frequency signal of said first delay circuit;
   a correlation detection circuit for detecting a correlation on the basis of said composite video signal, said delayed high-frequency signal of said first delay circuit and the output of said second delay circuit;
   a switch circuit for switching between (i) an output of said first comb filter, (ii) an output of said second comb filter and (iii) an output of said band pass filter in accordance with an output of said correlation detection circuit;
   a second filter, receiving an output of said switch circuit, for extracting a first filtered output, corresponding to high-frequency components, from said output of said switch circuit;
   a first calculation circuit for finding an absolute value of a second difference signal corresponding to an absolute value difference signal between said sum and difference signals; and
   a second switch circuit for switching between said first filtered output and the output of said correction circuit in accordance with said absolute value of said second difference signal.

3. A luminance/chrominance separator as set forth in claim 1, further comprising:
   a selector circuit for passing therethrough said sum signal when the absolute value of the sum signal is smaller than the absolute value of said difference signal and for passing therethrough said difference signal when the absolute value of the difference signal is smaller than the absolute value of the sum signal, and wherein said correction value calculation circuit comprises a polarity change circuit for changing a polarity of an output of said selector circuit in accordance with said absolute value magnitude relationship between said sum and difference signals.

4. A luminance/chrominance separator as set forth in claim 1, further comprising:
   a second delay circuit for delaying said delayed high-frequency signal of said first delay circuit by one horizontal period;
   a first comb filter for separating a luminance signal from a chrominance signal on the basis of said composite video signal and said delayed high-frequency signal of said first delay circuit;
   a second comb filter for separating the luminance signal from the chrominance signal on the basis of said delayed high-frequency signal of said first delay circuit and an output of said second delay circuit;
   a band pass filter for separating the luminance signal from the chrominance signal on the basis of said delayed high-frequency signal of said first delay circuit;
   a correlation detection circuit for a detection correlation on the basis of said composite video signal, said delayed high-frequency signal, said first delay circuit and the output of said second delay circuit;

a switch circuit for switching between (i) an output of said first comb filter, (ii) an output of said second comb filter and (iii) an output of said band pass filter in accordance with an output of said correlation detection circuit; and a second filter, receiving an output of said switch circuit, for extracting a first filtered output, corresponding to high-frequency components, from said output of said switch circuit therefrom.

5. A luminance/chrominance separator comprising:
a first filter for separating a high-frequency signal from a composite video signal;
a first delay circuit, receiving said high-frequency signal, for delaying said high-frequency signal by one horizontal period and outputting a delayed high-frequency signal;
a first adder, receiving said high-frequency signal and said delayed high-frequency signal, for finding a sum signal by summing said high-frequency signal and said delayed high-frequency signal of a current processing scanning line;
a first subtracter, receiving said high-frequency signal and said delayed high-frequency signal, for finding a difference signal by calculating a difference between said high-frequency signal and said delayed high-frequency signal;
a first absolute value circuit, receiving said sum signal, for finding an absolute value of said sum signal;
a second absolute value circuit, receiving said difference signal, for finding an absolute value of said difference signal;
a correction value calculation circuit for finding a correction signal based on said sum signal and said difference signal on the basis of an absolute value magnitude relationship between the sum and difference signals;
a first calculation circuit for finding an absolute value of a second difference signal indicative of a difference in absolute value between said sum and difference signals;
a first amplitude limiting circuit for limiting an amplitude of the correction signal of said correction value calculation circuit based on the absolute value of the second difference signal to obtain a second correction signal;
a comb filter for separating a luminance signal and a chrominance signal from said high-frequency signal and said delayed high-frequency signal;
a correction circuit for removing an unnecessary component contained in an output of said comb filter in accordance with said second correction value of said first amplitude limiting circuit;
a second delay circuit for delaying an output of said correction circuit by one line;
a correlation detection circuit for detecting a correlation in accordance with said composite video signal; and
a switch circuit for selecting one of (i) the output of the correction circuit and (ii) an output of said second delay circuit and (iii) a predetermined value in accordance with an output of said correlation detection circuit.

6. A luminance/chrominance separator as set forth in claim 5, wherein said first amplitude limiting circuit sets an amplitude of said correction value small, when the absolute value of said second difference signal is small.

7. A luminance/chrominance separator as set forth in claim 5, wherein said comb filter outputs a high-frequency luminance signal, and said switch circuit (i) selects the output of said second delay circuit when said correction detection circuit judges that a correlation between the signals of a current scanning line and the signals of a scanning line occurring one scanning period before is strong, (ii) selects the output of said correction circuit when said correlation detection circuit judges that a correlation between the signals of the current scanning line and the signals of a scanning line occurring one scanning period afterwards is strong, and (iii) selects zero when the correlation detection circuit judges that no correlation is present between the signals occurring before and after one scanning period.

8. A luminance/chrominance separator as set forth in claim 5, wherein said comb filter outputs a high-frequency chrominance signal, and said switch circuit (i) selects the output of said second delay circuit when said correlation detection circuit judges that a correlation between the signals of a current scanning line and the signals of a scanning line occurring one scanning period before is strong, (ii) selects the output of said correction circuit when said correlation detection circuit judges that a correlation between the signals of the current scanning line and the signals of a scanning line occurring one scanning period afterwards is strong, and selects the output of said first filter when the correlation detection circuit judges that no correlation is present between the signals occurring before and after one scanning period.

9. A luminance/chrominance separator comprising:
a first filter for separating a high-frequency signal from a composite video signal;
a first delay circuit, receiving said high-frequency signal, for delaying said high-frequency signal by one horizontal period and outputting a delayed high-frequency signal;
a first adder, receiving said high-frequency signal and said delayed high-frequency signal, for finding a sum signal by summing said high-frequency signal and said delayed high-frequency signal of a current processing scanning line;
a first subtracter, receiving said high-frequency signal and said delayed high-frequency signal, for finding a difference signal by calculating a difference between said high-frequency signal and said delayed high-frequency signal;
a first absolute value circuit, receiving said sum signal, for finding an absolute value of said sum signal;
a second absolute value circuit, receiving said difference signal, for finding an absolute value of said difference signal;
a correction value calculation circuit for finding a correction signal based on said sum signal and said difference signal on the basis of an absolute value magnitude relationship between the sum and difference signals;
a first calculation circuit for finding an absolute value of a second difference signal indicative of an absolute value difference between said sum and difference signals;
a first judgement circuit for judging whether said second difference signal is smaller than a predetermined value and for outputting a first judgement signal;
a second delay circuit for delaying said first judgement signal by one horizontal period to obtain a second judgement signal;

a comb filter for separating a luminance signal and a chrominance signal from said high-frequency signal and said delayed high-frequency signal delayed by one horizontal period;

a correction circuit for removing an unnecessary component contained in an output of said comb filter in accordance with said correction value of said correction value calculation circuit;

a third delay circuit for delaying an output of said correction circuit by one line;

a second luminance/chrominance separation circuit for separating said luminance signal and said chrominance signal; and a switch circuit for (i) selecting an output of said second luminance/chrominance separation circuit when said first and second judgement signals each indicate that an absolute value of said second difference signal is smaller than a predetermined value and (ii) selecting an output of said third delay circuit when only said first judgement signal indicates that said second difference signal is smaller than the predetermined value and (iii) selecting an output of said correction value circuit when only said second judgement signal indicates that said second difference signal is smaller than the predetermined value.

10. A luminance/chrominance separator comprising:

a first filter for separating a high-frequency signal from a composite video signal and outputting said high-frequency signal;

a first delay circuit, receiving said high-frequency signal, for delaying said high-frequency signal by one horizontal period and outputting a delayed high-frequency signal;

a first adder, receiving said high-frequency signal and said delayed high-frequency signal, for finding a sum signal by summing said high frequency signal and said delayed high-frequency signal of a current processing scanning line;

a first subtracter, receiving said high-frequency signal and said delayed high-frequency signal, for finding a difference signal by calculating a difference between said high-frequency signal and said delayed high-frequency signal;

a first absolute value circuit, receiving said sum signal, for finding an absolute value of said sum signal;

a second absolute value circuit, receiving said difference signal, for finding an absolute value of said difference signal;

a correction value calculation circuit for finding a correction signal based on said sum signal and said difference signal on the basis of an absolute value magnitude relationship between the sum and difference signals;

a first calculation circuit for finding an absolute value of a second difference signal indicative of an absolute value difference between said sum and difference signals;

a first judgement circuit for judging whether said second difference signal is smaller than a predetermined value and for outputting a first judgement signal;

a second delay circuit for delaying said first judgement signal by one horizontal period to obtain a second judgement signal;

an amplitude limiting circuit for limiting an amplitude of the correction value of said correction value calculation circuit based on said first and second judgement signals so as to output a second correction value;

a comb filter for separating a luminance signal and a chrominance signal from the high-frequency signal and said delayed high-frequency signal;

a correction circuit for removing an unnecessary component contained in an output of said comb filter in accordance with said second correction value of said second amplitude limiting circuit;

a third delay circuit for delaying an output of said correction circuit by one line;

a switch circuit for selecting (i) an output of said third delay circuit when said first judgement signal indicates that said second difference signal is smaller than a predetermined value and (ii) selecting an output of said correction circuit when said second judgement signal indicates that said second difference signal is smaller than the predetermined value and (iii) selecting a predetermined one of the outputs of said correction value circuit and second delay circuit when said first and second judgement signals each indicate that an absolute value of said second difference signal is smaller than the predetermined value; and a third amplitude limiting circuit for limiting an output of said switch circuit based on said first and second judgement signals.

11. A luminance/chrominance separator as set forth in claim 10, wherein said second amplitude limiting circuit operates to set an amplitude of said correction value small when said first and second judgement signals each indicate that an absolute value of said second difference signal is smaller than the predetermined value.

12. A luminance/chrominance separator as set forth in claim 10, wherein said third amplitude limiting circuit operates to set an output of said switch circuit small when said first and second judgement signals each indicate that an absolute value of said second difference signal is smaller than the predetermined value.

13. A luminance/chrominance separator comprising:

first filter for separating a high-frequency signal from a composite video signal and outputting said high-frequency signal;

a first delay circuit, receiving said high-frequency signal, for delaying said high-frequency signal by one horizontal period and outputting a delayed high-frequency signal;

a first adder, receiving said high-frequency signal and said delayed high-frequency signal, for finding a sum signal by summing said and said delayed high-frequency signal of a current processing scanning line;

a first subtracter, receiving said high-frequency signal and said delayed high-frequency signal, for finding a difference signal by calculating a difference between said high-frequency signal and said delayed high-frequency signal;

a first absolute value circuit, receiving said sum signal, for finding an absolute value of said sum signal;

a second absolute value circuit, receiving said difference signal, for finding an absolute value of said difference signal;

a correction value calculation circuit for finding a correction signal based on said sum signal and said difference signal on the basis of an absolute value magnitude relationship between the sum and difference signals;

a first calculation circuit for finding an absolute value of a second difference signal indicative of an absolute value difference between said sum and difference signals;

a first judgement circuit for judging whether said second difference signal is smaller than a predetermined value and for outputting a first judgement signal;

a second delay circuit for delaying said first judgement signal by one horizontal period to obtain a second judgement signal;

an amplitude limiting circuit for limiting an amplitude of the correction value of said correction value calculation circuit based on said first judgement signal so as to obtain a second correction value;

a comb filter for separating a luminance signal and a chrominance signal from said high-frequency signal and said delayed high-frequency signal;

a correction circuit for removing an unnecessary component contained in an output of said comb filter in accordance with said second correction value of said amplitude limiting circuit;

a third delay circuit for delaying an output of said correction circuit by one line; and a switch circuit for (i) selecting an output of said third delay circuit when said first judgement signal indicates that said second difference signal is smaller than a predetermined value and (ii) selecting an output of said correction circuit when said second judgement signal indicates that said second difference signal is smaller than the predetermined value and (iii) selecting a zero signal when said first and second judgement signals each indicate that an absolute value of said second difference signal is smaller than the predetermined value.

14. A luminance/chrominance separator comprising:

a filter means for separating particular frequency components, including a chrominance subcarrier frequency component, from a composite video signal and outputting a particular frequency components signal;

a first delay circuit, receiving said particular frequency components signal, for delaying said particular frequency components signal by one horizontal scanning period and outputting a delayed signal;

an adder, receiving said particular frequency components signal and said delayed signal, for finding a sum signal by summing said particular frequency components signal and said delayed signal;

a subtracter, receiving said particular frequency components signal and said delayed signal, for finding a difference signal by calculating a difference between said particular frequency components signal and said delayed signal;

a first absolute value circuit, receiving said sum signal, for finding an absolute value of said sum signal;

a second absolute value circuit, receiving said difference signal, for finding an absolute value of said difference signal;

a correction signal calculation circuit for finding a correction signal based on said sum signal and said difference signal in accordance with a magnitude relationship between the absolute value of the sum signal and the absolute value of the difference signal;

a comb filter for separating at least one of (i) a luminance signal and (ii) a chrominance signal from said particular frequency components signal and said delayed particular frequency components signal in accordance with one of (a) said sum signal and (b) said difference signal; and a correction circuit for reducing unnecessary components contained in an output of said comb filter in accordance with said correction signal.

15. A luminance/chrominance separator according to claim 14, wherein said correction signal calculation circuit comprises:

a selector for (i) selecting said sum signal when the absolute value of said sum signal is smaller than the absolute value of said difference signal and (ii) selecting said difference signal when the absolute value of said difference signal is smaller than the absolute value of said sum signal; and a polarity change circuit for changing a polarity of an output of said selector in accordance with said magnitude relationship between the absolute value of the sum signal and the absolute value of the difference signal.

16. A luminance/chrominance separator according to claim 15, wherein said polarity change circuit changes the polarity of the output of said selector when the absolute value of said sum signal is smaller than the absolute value of said difference signal.

17. A luminance/chrominance separator according to claim 14, further comprising a second delay circuit for delaying said particular frequency components signal by one horizontal scanning period;

a third delay circuit for delaying an output of said second delay circuit by one horizontal scanning period;

a second comb filter for separating a selected one of (i) a luminance signal and (ii) a chrominance signal from said particular frequency components signal and an output of said second delay circuit;

a third comb filter for separating a selected one of (i) luminance signal and (ii) a chrominance signal from the output of said second delay circuit and an output of said third delay circuit;

a second filter means for separating a selected one of (i) a first signal which includes the chrominance subcarrier frequency component and (ii) a second signal which does not include the chrominance subcarrier frequency component, from the output of said second delay circuit;

a correlation detecting circuit for detecting a correlation between said particular frequency components signals and the output of said second delay circuit and the output of said third delay circuit;

a first selector for selecting one of (i) an output of said second comb filter and (ii) an output of said third comb filter and (iii) an output of said second filter means, in accordance with an output of said correlation detecting circuit;

a third filter for extracting high frequency components from an output of said first selector;

a calculation circuit for finding an absolute value of a comparison signal by calculating a difference between the absolute value of said sum signal and the absolute value of said difference signal; and a second selector for selecting one of (i) an output of said third filter and (ii) an output of said correction circuit, in accordance with an absolute value of said comparison signal.

18. A luminance/chrominance separator according to claim 17, wherein said second selector (i) selects the output of said third filter when the absolute value of the comparison signal is smaller than a predetermined value and (ii) selects the output of said correction circuit when the absolute value of the comparison signal is not smaller than said predetermined value.

19. A luminance/chrominance separator comprising:

a filter means for separating particular frequency components, including a chrominance subcarrier frequency component, from a composite video signal and outputting a particular frequency components signal;

a first delay circuit, receiving said particular frequency components signal, for delaying said particular frequency components signal by one horizontal scanning period and outputting a delayed signal;

an adder, receiving said particular frequency components signal and said delayed signal, for finding a sum signal by summing said particular frequency components signal and said delayed signal;

a subtracter, receiving said particular frequency components signal and said delayed signal, for finding a difference signal by calculating a difference between said particular frequency components signal and said delayed signal;

a first absolute value circuit, receiving said sum signal, for finding an absolute value of said sum signal;

a second absolute value circuit, receiving said difference signal, for finding an absolute value of said difference signal;

a correction signal calculation circuit for finding a correction signal based on said sum signal and said difference signal in accordance with a magnitude relationship between said absolute value of the sum signal and the absolute value of the difference signal;

a calculation circuit for finding an absolute value of a comparison signal by calculating a difference between the absolute value of said sum signal and the absolute value of said difference signal;

an amplitude limiting circuit for limiting an amplitude of said correction signal based on the absolute value of the comparison signal so as to obtain a second correction signal;

a comb filter for separating a selected one of (i) a luminance signal and (ii) a chrominance signal from said particular frequency components signal and the delay signal by using a selected one of (a) the sum signal and (b) the difference signal;

a correction circuit for reducing unnecessary components contained in an output of said comb filter in accordance with said second correction signal;

a second delay circuit for delaying an output of said correction circuit by one horizontal scanning period;

a correlation detection circuit for detecting a correlation in accordance with said particular frequency components signal; and a selector for selecting one of (i) the output of said correction circuit and (ii) an output of said second delay circuit and a predetermined one of (a) a predetermined value and (b) said delayed signal in accordance with an output of said correlation detection circuit.

20. A luminance/chrominance separator according to claim 19, wherein said amplitude limiting circuit reduces the amplitude of the correction signal when the absolute value of said comparison signal is a small value.

21. A luminance/chrominance separator according to claim 19, wherein said comb filter separates a luminance signal by using the sum signal;

said correlation detection circuit includes a third delay circuit for further delaying said delayed signal by one horizontal scanning period so as to obtain a twice delayed signal, and detects a first correlation indicative of a correlation between said particular frequency components signal and said delayed signal and detects a second correlation indicative of a correlation between said delayed signal and said twice delayed signal; and said selector selects the output of said correction circuit when said correlation detection circuit judges said first correlation to be strong, and selects the output of said second delay circuit when said correlation detection circuit judges said second correlation to be strong, and selects a value zero as said predetermined value when said correlation detection circuit judges neither said first correlation nor said second correlation to be strong.

22. A luminance/chrominance separator according to claim 19, wherein said comb filter separates a chrominance signal by using the difference signal;

said correlation detection circuit includes a third delay circuit for further delaying said delayed signal by one horizontal scanning period so as to obtain a twice delayed signal, and detects a first correlation indicative of a correlation between said particular frequency components signal and said delayed signal and detects a second correlation indicative of a correlation between said delayed signal and said twice delayed signal; and said selector (i) selects the output of said correction circuit when said correlation detection circuit judges said first correlation to be strong, and (ii) selects the output of said second delay circuit when said correlation detection circuit judges said second correlation to be strong, and (iii) selects the delayed signal when said correlation detection circuit judges neither said first correlation nor said second correlation to be strong.

23. A luminance/chrominance separator comprising:

a filter means for separating particular frequency components, including a chrominance subcarrier frequency component, from a composite video signal and outputting a particular frequency components signal;

a first delay circuit, receiving said particular frequency components signal, for delaying said particular frequency components signal by one horizontal scanning period and outputting a delayed signal;

an adder, receiving said particular frequency components signal and said delayed signal, for finding a sum signal by summing said particular frequency components signal and said delayed signal;

a subtracter, receiving said particular frequency components signal and said delayed signal, for finding a difference signal by calculating a difference between said particular frequency components signal and said delayed signal;

a first absolute value circuit, receiving said sum signal, for finding an absolute value of said sum signal;

a second absolute value circuit, receiving said difference signal, for finding an absolute value of said difference signal;

a correction signal calculation circuit for finding a correction signal based on said sum signal and said difference signal in accordance with a magnitude relationship between the absolute value of the sum signal and the absolute value of the difference signal;

a comb filter for separating a selected one of (i) a luminance signal and (ii) a chrominance signal from said particular frequency components signal and said delayed signal in accordance with one of (a) said sum signal and (b) said difference signal;

a correction circuit for reducing unnecessary components contained in an output of said comb filter in accordance with said correction signal;

a second delay circuit for delaying an output of said correction circuit by one horizontal scanning period;

a calculation circuit for finding an absolute value of a comparison signal indicative of a difference between the absolute value of said sum signal and the absolute value of said difference signal;

a judgement circuit for outputting a first judgement signal when said judgement circuit judges that the absolute value of said comparison signal is smaller than a predetermined value;

a third delay circuit for delaying said first judgement signal by one horizontal scanning period so as to obtain a second judgement signal;

a luminance/chrominance separation circuit for separating a selected one of (i) a luminance signal and (ii) a chrominance signal from said particular frequency components signal and said delayed signal; and a selector for (i) selecting an output of said correction signal calculation circuit in the presence of only said second judgement signal and (ii) selecting an output of said second delay circuit in the presence of only said first judgement signal and (ii) selecting an output of said luminance/chrominance separation circuit in the presence of both of said first and second judgement signals.

24. A luminance/chrominance separator according to claim 23, wherein
said comb filter separates a luminance signal by using the sum signal; and
said luminance/chrominance separation circuit comprises a second comb filter for separating a luminance signal from said delayed signal and at least one of (i) said particular frequency components signal and (ii) a twice delayed signal which is obtained by delaying said delayed signal by one horizontal scanning period; and
a second selector for (i) selecting said delayed signal when an amplitude of the delayed signal is smaller than a second predetermined value and (ii) otherwise selecting an output of said second comb filter.

25. A luminance/chrominance separator comprising:
a filter means for separating particular frequency components, including a chrominance subcarrier frequency component, from a composite video signal and outputting a particular frequency components signal;

a first delay circuit, receiving said particular frequency components signal, for delaying said particular frequency components signal by one horizontal scanning period and outputting a delayed signal;

an adder, receiving said particular frequency components signal and said delayed signal, for finding a sum signal by summing said particular frequency components signal and said delayed signal;

a subtracter, receiving said particular frequency components signal and said delayed signal, for finding a difference signal by calculating a difference between said particular frequency components signal and said delayed signal;

a first absolute value circuit, receiving said sum signal, for finding an absolute value of said sum signal;

a second absolute value circuit, receiving said difference signal, for finding an absolute value of said difference signal;

a correction signal calculation circuit for finding a correction signal based on said sum signal and said difference signal in accordance with a magnitude relationship between the absolute value of the sum signal and the absolute value of the difference signal;

a calculation circuit for finding an absolute value of a comparison signal indicative of a difference between the absolute value of the sum signal and the absolute value of the difference signal;

a judgement circuit for outputting a first judgement signal when said judgement circuit judges that an absolute value of said comparison signal is smaller than a predetermined value;

a second delay circuit for delaying said first judgement signal by one horizontal scanning period so as to obtain a second judgement signal;

a first amplitude limiting circuit for limiting an amplitude of said correction signal based on said first and second judgement signals so as to obtain a second correction signal;

a comb filter for separating a selected one of (i) a luminance signal and (ii) a chrominance signal from said particular frequency components signal and said delayed signal by using a selected one of said sum signal and said difference signal;

a correction circuit for reducing unnecessary components contained in an output of said comb filter by using said second correction signal;

a third delay circuit for delaying an output of said correction circuit by one horizontal scanning period;

a selector for (i) selecting an output of said correction circuit in the presence of only said second judgement signal and (ii) selecting an output of said third delay circuit in the presence of only said first judgement signal and (iii) selecting a predetermined one of (a) the output of said correction circuit and (b) the output of said second delay circuit in the presence of both of said first and second judgement signals; and a second amplitude limiting circuit for limiting an output of said selector based on said first and second judgement signals.

26. A luminance/chrominance separator according to claim 25, wherein said first amplitude limiting circuit reduces the amplitude of said correction value in the presence of both of said first and second judgement signals.

27. A luminance/chrominance separator according to claim 25, wherein said second amplitude limiting circuit reduces the output of said selector in the presence of both of said first and second judgement signals.

28. A luminance/chrominance separator comprising:

a filter means for separating particular frequency components, including a chrominance subcarrier frequency component, from a composite video signal and outputting a particular frequency components signal;

a first delay circuit, receiving said particular frequency components signal, for delaying said particular frequency components signal by one horizontal scanning period and outputting a delayed signal;

an adder, receiving said particular frequency components signal and said delayed signal, for finding a sum signal by summing said particular frequency components signal and said delayed signal;

a subtracter, receiving said particular frequency components signal and said delayed signal, for finding a difference signal by calculating a difference between said particular frequency components signal and said delayed signal;

a first absolute value circuit, receiving said sum signal, for finding an absolute value of said sum signal;

a second absolute value circuit, receiving said difference signal, for finding an absolute value of said difference signal;

a correction signal calculation circuit for finding a correction signal based on said sum signal and said difference signal in accordance with a magnitude relationship between the absolute value of the sum signal and the absolute value of the difference signal;

a calculation circuit for finding an absolute value of a comparison signal indicative of a difference between the absolute value of the sum signal and the absolute value of the difference signal;

a judgement circuit for outputting a first judgement signal when said judgement circuit judges that an absolute value of said comparison signal is smaller than a predetermined value;

a third delay circuit for delaying said first judgement signal by one horizontal scanning period so as to obtain a second judgement signal;

an amplitude limiting circuit for limiting an amplitude of said correction signal based on said first judgement signal so as to obtain a second correction signal;

a comb filter for separating a selected one of (i) a luminance signal and (ii) a chrominance signal from said particular frequency components signal and said delayed signal by using a selected one of said sum signal and said difference signal;

a correction circuit for reducing unnecessary components contained in an output of said comb filter by using said second correction signal;

a second delay circuit for delaying an output of said correction circuit by one horizontal scanning period;

a selector for (i) selecting an output of said correction circuit in the presence of only said second judgement signal and (ii) selecting an output of said second delay circuit in the presence of only said first judgement signal and (iii) selecting a predetermined one of (a) a value zero and (b) said delayed signal in the presence of both of said first and second judgement signals.

* * * * *